United States Patent
Luo et al.

(10) Patent No.: US 11,800,515 B2
(45) Date of Patent: Oct. 24, 2023

(54) SIGNALING FOR CHANNEL ACCESS PROCEDURE TYPE SELECTION IN NEW RADIO NETWORK WITH UNLICENSED SPECTRUM

(71) Applicant: QUALCOMM Incorporated, San Diego, CA (US)

(72) Inventors: Jianghong Luo, Skillman, NJ (US); Xiaoxia Zhang, San Diego, CA (US); Tao Luo, San Diego, CA (US); Jing Sun, San Diego, CA (US); Navid Abedini, Basking Ridge, NJ (US); Luca Blessent, Whitehouse Station, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/221,713

(22) Filed: Apr. 2, 2021

(65) Prior Publication Data
US 2021/0352688 A1 Nov. 11, 2021

Related U.S. Application Data

(60) Provisional application No. 63/028,368, filed on May 21, 2020, provisional application No. 63/020,454, filed on May 5, 2020, provisional application No. 63/020,458, filed on May 5, 2020.

(51) Int. Cl.
*H04W 72/12* (2023.01)
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ............ H04W 72/1268; H04W 72/23; H04W 74/0808
See application file for complete search history.

(56) References Cited

U.S. PATENT DOCUMENTS

| | | | |
|---|---|---|---|
| 2018/0288805 A1* | 10/2018 | Bhorkar | H04W 74/0816 |
| 2021/0298080 A1* | 9/2021 | Wu | H04W 72/1263 |
| 2022/0210823 A1* | 6/2022 | Alfarhan | H04L 1/1887 |
| 2022/0279592 A1* | 9/2022 | Wu | H04W 74/004 |

* cited by examiner

*Primary Examiner* — Khaled M Kassim
*Assistant Examiner* — Zhaohui Yang
(74) *Attorney, Agent, or Firm* — Loza & Loza, LLP

(57) ABSTRACT

In a channel occupancy time (COT), a scheduling entity can transmit a first downlink (DL) transmission burst to a scheduled entity, and receive an uplink (UL) transmission burst from the scheduled entity. The scheduling entity can determine whether the scheduled entity performed a type 1 or type 2 channel access procedure for the UL transmission burst. A scheduled entity can use a first type of channel access procedure to initiate a first COT on a communication channel and request a network access node to perform a second type of channel access procedure in a next DL transmission burst. A network access node can receive a message from a scheduled entity, wherein the message comprises a control indication requesting the network access node to perform a first type of channel access procedure in a next DL transmission burst.

27 Claims, 22 Drawing Sheets

Channel Access Priority Class

| Channel Access Priority Class ($p$) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | 3, 7 |
| 2 | 1 | 7 | 15 | 3 ms | 7, 15 |
| 3 | 3 | 15 | 63 | 8 or 10 ms | 15, 31, 63 |
| 4 | 7 | 15 | 1023 | 8 or 10 ms | 15, 31, 63, 127, 255, 511, 1023 |

FIG. 5

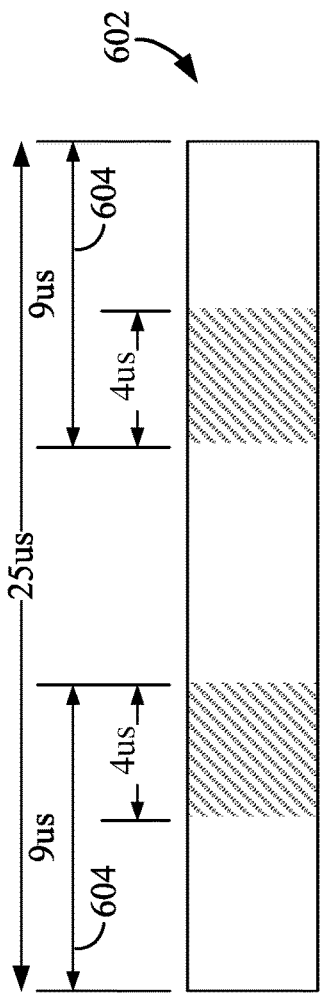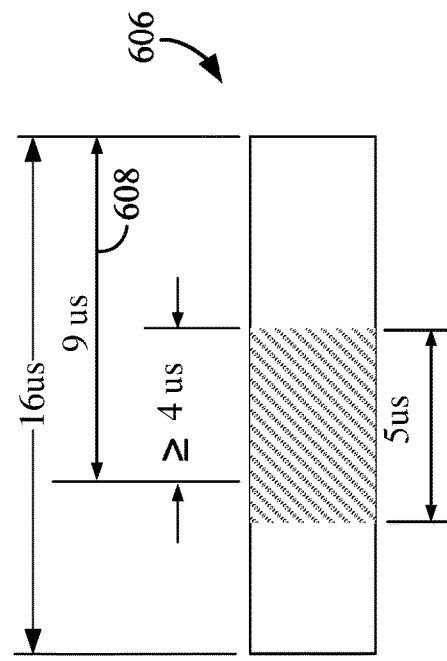
FIG. 6A
FIG. 6B

SIGNALING FOR CHANNEL ACCESS PROCEDURE TYPE SELECTION IN NEW RADIO NETWORK WITH UNLICENSED SPECTRUM

PRIORITY CLAIM

This application claims priority to and the benefit of provisional patent application No. 63/028,368 filed in the United stated Patent Office on May 21, 2020, provisional patent application 63/020,454 filed in the United States Patent Office on May 5, 2020, and provisional patent application No. 63/020,458 filed in the United States Patent Office on May 5, 2020, the entire content of each prior application is incorporated herein by reference as if fully set forth below in its entirety and for all applicable purposes.

TECHNICAL FIELD

The technology discussed below relates generally to wireless communication systems, and more particularly, to signaling for a channel access procedure in a wireless communication network using unlicensed spectrum.

BACKGROUND

The 5G New Radio (NR) mobile telecommunication systems can provide higher data rates, lower latency, and improved system performance than previous generation systems such as Long Term Evolution (LTE) communication systems. To meet the increasing demand in wireless communications, additional spectrum is needed. However, the amount of licensed spectrum is limited. Therefore, using unlicensed or shared spectrum may offer a solution to meet the exponential increase in wireless communication demand. Access to shared and unlicensed spectrum can extend 5G NR in multiple dimensions such as providing more capacity, higher spectrum utilization, and new deployment scenarios. It can benefit mobile operators with licensed spectrum, but also create opportunities for those without licensed spectrum to take advantage of 5G NR technologies. In general, a wireless communication device performs a channel access procedure to access unlicensed spectrum or carrier, such as New Radio-Unlicensed (NR-U).

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide various signaling enhancements for facilitating and controlling channel access type switching in a New Radio (NR) network using an unlicensed spectrum (e.g., NR-U). In some aspects, the disclosed signaling enhancements may be applied in other network types, for example, integrated access and backhaul (IAB).

One aspect provides a method of wireless communication at a scheduling entity. The scheduling entity performs a first channel access procedure to initiate a first channel occupancy time (COT) on a communication channel. The scheduling entity transmits a first downlink (DL) transmission burst on the communication channel during the first COT to a scheduled entity. The scheduling entity receives an uplink (UL) transmission burst on the communication channel during the first COT from the scheduled entity. The scheduling entity determines a type of a second channel access procedure performed by the scheduled entity for the UL transmission burst.

One aspect provides a scheduling entity for wireless communication. The scheduling entity includes a communication interface configured for wireless communication with a scheduled entity via a communication channel, a memory, and a processor operatively coupled to the communication interface and the memory. The processor and the memory are configured to perform a first channel access procedure to initiate a first COT on the communication channel. The processor and the memory are further configured to transmit, to the scheduled entity, a first DL transmission burst on the communication channel during the first COT. The processor and the memory are further configured to receive, from the scheduled entity, an UL transmission burst on the communication channel during the first COT. The processor and the memory are further configured to determine a type of a second channel access procedure performed by the scheduled entity for the UL transmission burst.

One aspect provides a method of wireless communication at a scheduled entity. The scheduled entity receives, from a scheduling entity, a first DL transmission burst on a communication channel during a first COT initiated by the scheduling entity using a first type of channel access procedure. The scheduled entity determines to use the first type of channel access procedure or a second type of channel access procedure for a first UL transmission burst based on a predetermined condition associated with the first UL transmission burst. The scheduled entity transmits, to the scheduling entity, the first UL transmission burst on the communication channel during the first COT using the determined first type of channel access procedure or second type of channel access procedure.

One aspect provides a scheduled entity for wireless communication. The scheduled entity includes a communication interface configured for wireless communication with a scheduling entity via a communication channel, a memory, and a processor operatively coupled to the communication interface and the memory. The processor and the memory are configured to receive, from the scheduling entity, a first DL transmission burst on a communication channel during a first COT initiated by the scheduling entity using a first type of channel access procedure. The processor and the memory are further configured to determine to use the first type of channel access procedure or a second type of channel access procedure for a first UL transmission burst based on a predetermined condition associated with the UL transmission burst. The processor and the memory are further configured to transmit, to the scheduling entity, the first UL transmission burst on the communication channel during the first COT using the determined first type of channel access procedure or second type of channel access procedure.

These and other aspects of the invention will become more fully understood upon a review of the detailed description, which follows. Other aspects, features, and examples will become apparent to those of ordinary skill in the art, upon reviewing the following description of specific, exemplary implementations in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary implementations may be discussed below as device, system, or method, it should be understood that such examples be implemented in various devices, systems, and methods.

BRIEF DESCRIPTION OF THE DRAWINGS

FIG. 5 is a table illustrating different channel access priority classes and associated parameters according to some aspects of the disclosure.

FIGS. 6A and 6B are schematic illustration of second types of channel access procedure according to some aspects of the disclosure.

DETAILED DESCRIPTION

Figure 1:
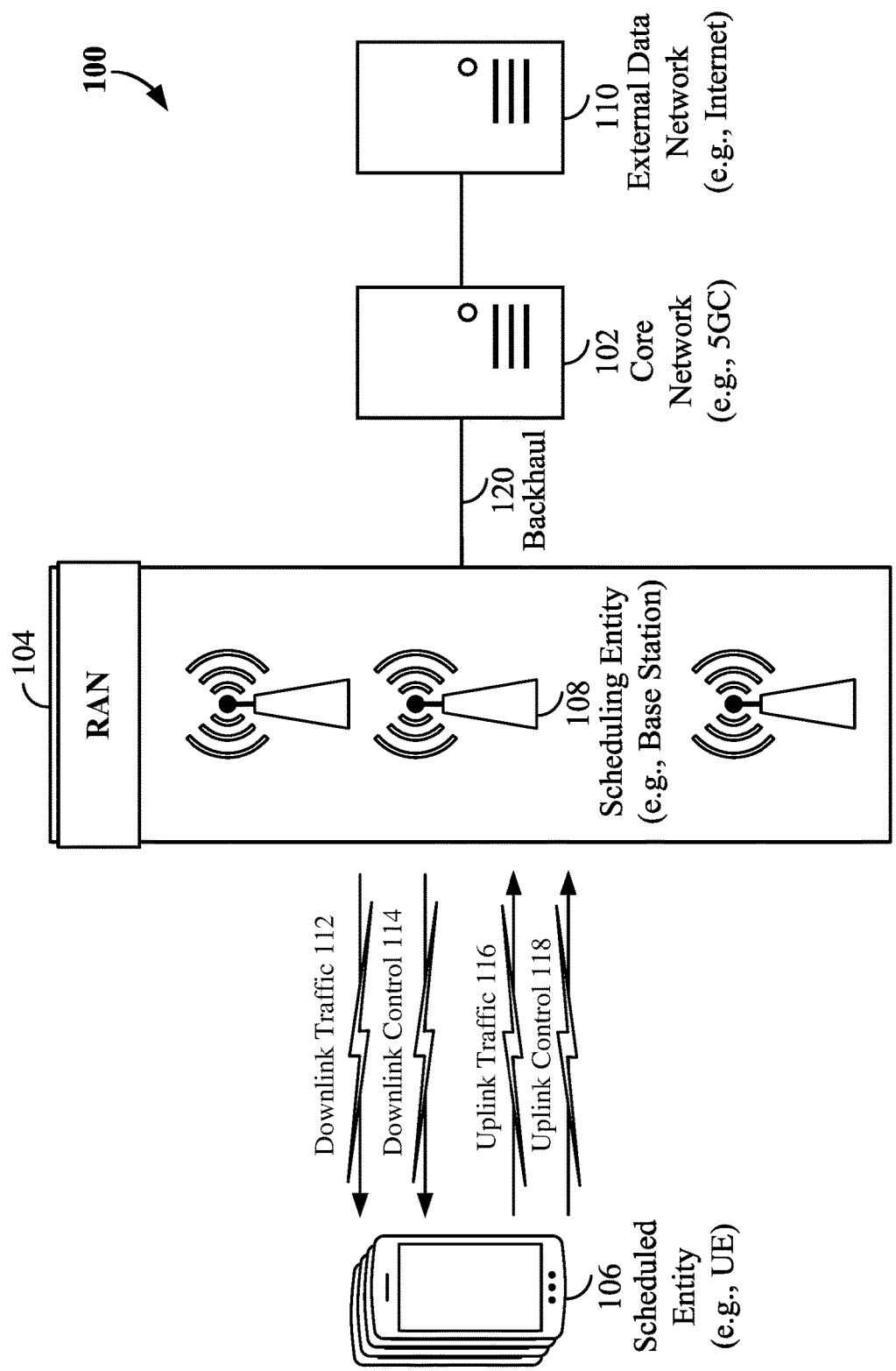
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In an air interface, for example between a wireless communication device (e.g., a scheduled entity, a user equipment (UE), etc.) and a network access node (e.g., a scheduling entity, a base station, a gNB, etc.), the wireless communication device may initiate two-way wireless communication with the network access node over an unlicensed carrier. Similarly, the network access node may initiate two-way wireless communication with the wireless communication device over an unlicensed carrier. The air interface between the wireless communication device and the network access node on the unlicensed carrier may be referred to as a channel. It is through this wireless channel that communications are conducted. The amount of time allocated to the communication channel between the wireless communication device and the network access node on the unlicensed carrier may be referred to as a channel occupancy time (COT).

When using an unlicensed carrier (e.g., NR-U), a wireless communication device or a network access node uses a channel access procedure to sense the channel prior to any transmission. A COT can be initiated by a wireless communication device or a network access node. After performing the channel access procedure, the wireless communication device or network access node can access the channel for an upcoming transmission (e.g., uplink or downlink transmission) in a new COT or an existing COT initiated by the other device.

During a wireless communication device initiated COT, the network access node can decide on the type of channel access procedure to use for the next communication from the network access node to the wireless communication device. In some aspects, using a Third Generation Partnership Project (3GPP) standard known as New Radio-Unlicensed (NR-U), a network access node may select a channel access procedure type for an upcoming downlink transmission, referred to as a downlink transmission burst.

During a network access node initiated COT, the network access node may indicate, to the wireless communication device, the type of channel access procedure to use for the next communication (e.g., uplink transmission) from the wireless communication device to the network access node. However, the wireless communication device may or may not use the indicated or requested channel access procedure for the uplink transmission depending on the particular implementation of the wireless communication device. In some aspects, the network access node can configure or dynamically indicate whether the wireless communication device can switch a channel access procedure type for an upcoming uplink transmission within a COT initiated by the network access node when certain conditions are met.

The selection of channel access procedure type may be based on a number of factors, including, for example, a buffer status report (BSR) sent from the wireless communication device (e.g., UE) to the network access node (e.g., base station). The BSR may include information that is indicative of an amount of traffic held for uplink transmission in one or more buffers of the wireless communication device. Knowledge of the amount of traffic held by the wireless communication device for uplink transmission may inform the network access node as to the length of time that the wireless communication device will need to complete the uplink transmission. This time may be expressed as the COT.

The type and priority of traffic may also inform the network access node as to what procedure it should use for its next attempt to access the wireless communication channel. For example, if the wireless communication device has low latency uplink traffic (e.g., ultra-reliable low latency communication (URLLC) traffic) pending, it may be desirable for the network access node to use a type 1 channel access procedure for its next downlink transmission, as the type 1 channel access procedure may allow the network access node to extend the COT of a channel presently used by the wireless communication device.

However, the BSR is a medium access control (MAC) layer procedure, and the BSR is handled by a MAC control element (MAC-CE). Because the BSR is handled by the MAC-CE, there is a certain amount of processing time that can be expected before the BSR content (e.g., buffer size) is useable by the network access node. This processing time represents an unwanted delay in the time it takes for the network access node to determine what type of procedure to use for its next downlink transmission to the wireless communication device.

Providing a network access node with information (e.g., an indication, instruction, request, message, or signal) that would enable the network access node to decide on a type of channel access procedure, in less time than may currently be expected for the decision, may improve the overall throughput of communications between the wireless communication device and the network access node. For example, uplink signaling that allows the wireless communication device to request a specific channel access procedure type (or instruct a network access node to perform a specific channel access procedure type) may result in the least amount of delay toward completion of the transfer of uplink traffic from the buffers of the wireless communication device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
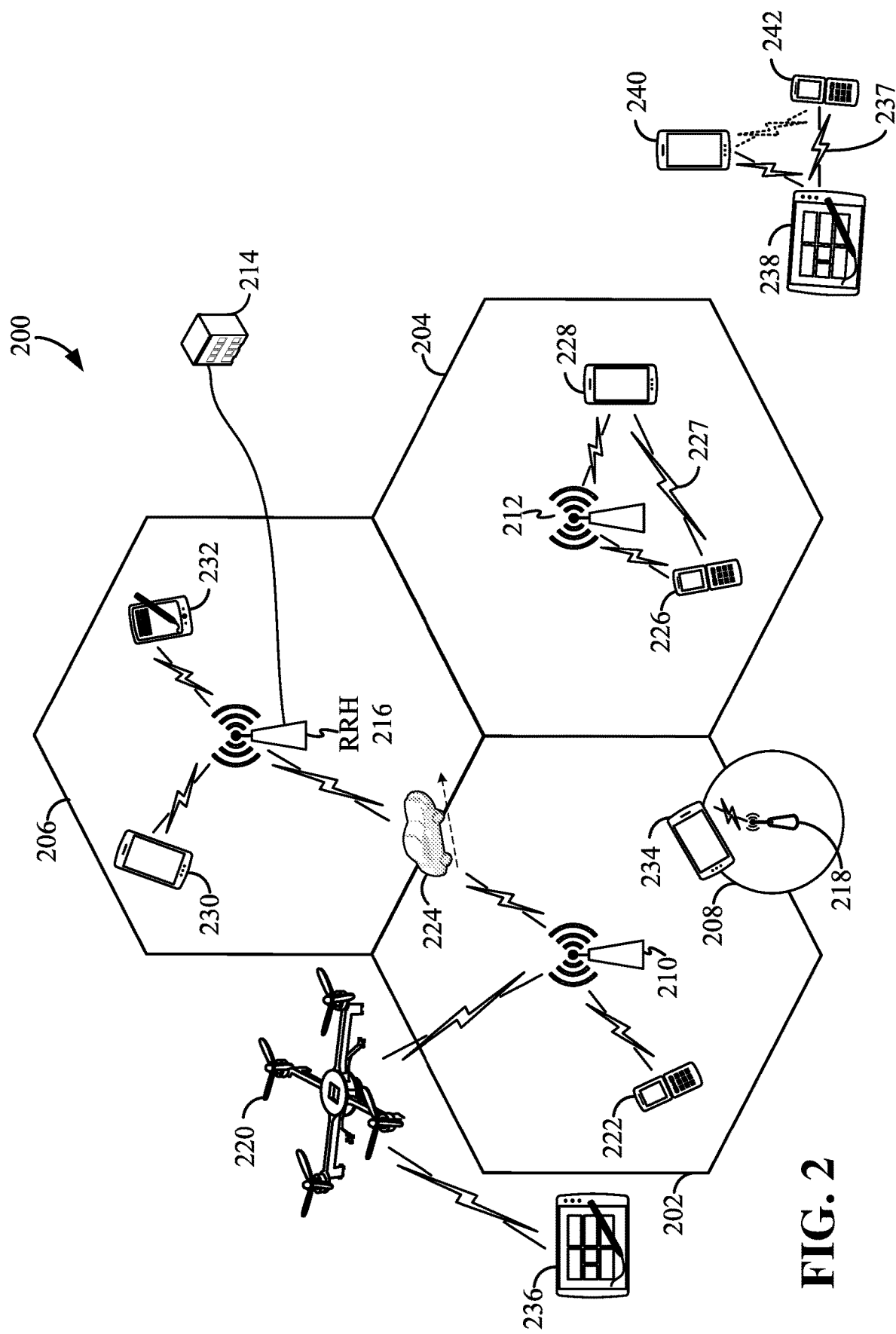
FIG. 2 is an illustration of an example of a radio access network according to some aspects of the disclosure.

FIG. 2 is an illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure the strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network (RAN) 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

In some examples, a frame refers to a predetermined duration (e.g., 10 ms for wireless transmissions, with each frame consisting of 10 subframes of 1 ms each). Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones of the carrier.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
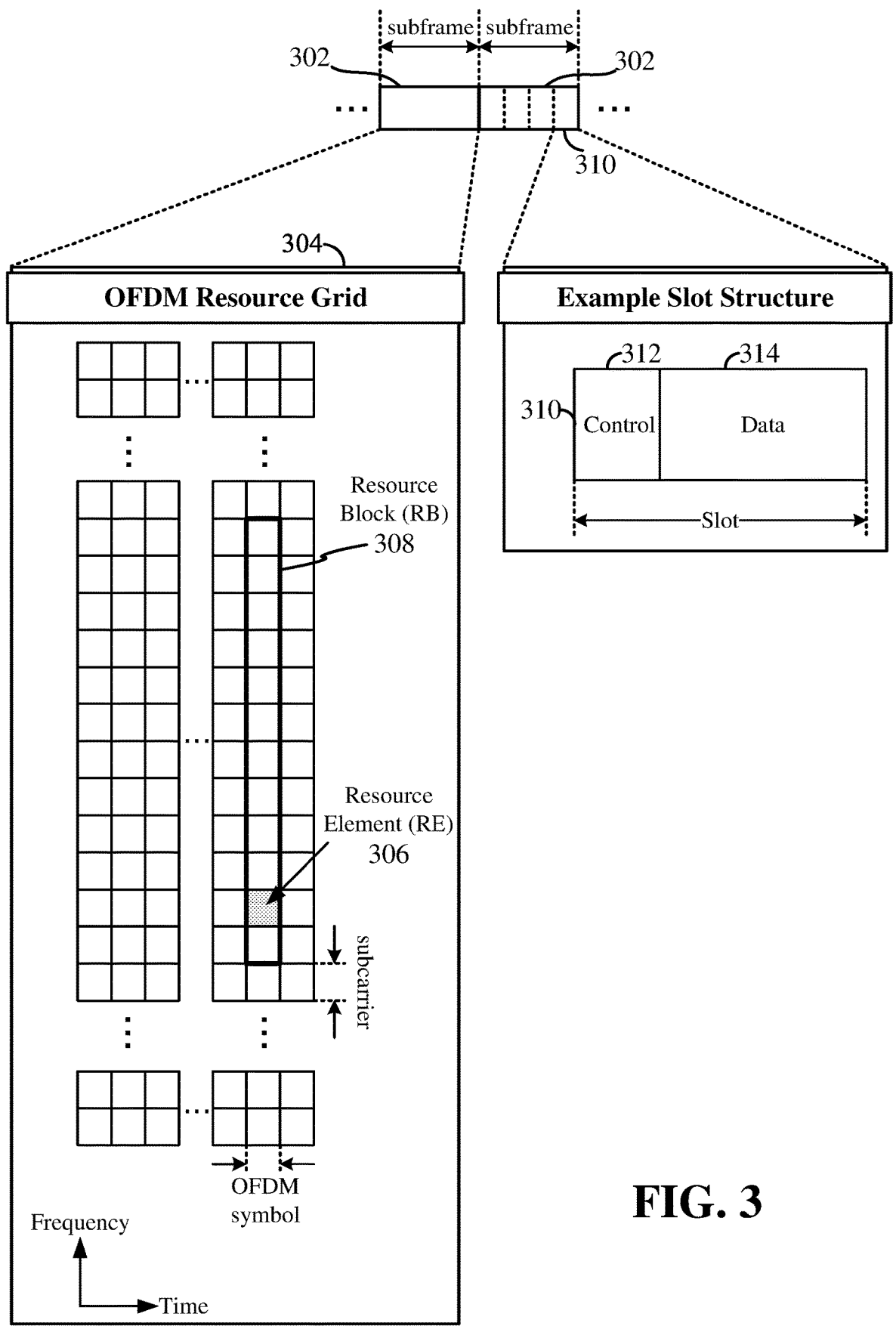
FIG. 3 is a schematic illustration of an organization of wireless resources in an air interface utilizing orthogonal frequency divisional multiplexing (OFDM) according to some aspects of the disclosure.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Channel Access Procedure of Shared/Unlicensed Spectrum

An NR-U network can support the use of a shared spectrum or unlicensed spectrum. An NR-U network can use a shared/unlicensed spectrum to provide wireless access to wireless devices (e.g., gNB or UE). In this disclosure, a channel may refer to a carrier or a part of a carrier consisting of a contiguous set of resource blocks (e.g., RBs 308) on which a channel access procedure may be performed in the shared spectrum. A channel access procedure for NR-U is a procedure based on channel sensing that evaluates the availability (e.g., idle or busy) of a channel for performing signal transmissions. The basic unit for sensing is a sensing slot (e.g., 9 μs slot) with a predetermined duration. In one example, a wireless device (e.g., gNB or UE) can detect wireless signal power (e.g., received signal strength indication (RSSI)) for a predetermined interval (e.g., 4 μs) within a sensing slot. The sensing slot is considered to be idle when the sensed wireless signal power is less than a certain energy threshold; otherwise, the sensing slot is considered to be busy (i.e., not available).

A channel occupancy refers to a transmission on a channel by a wireless device (e.g., gNB or UE) after performing the corresponding channel access procedure. A channel occupancy time (COT) refers to the total time for which a wireless device (e.g., gNB or UE) and another device (e.g., gNB or UE) sharing the channel occupancy perform transmission(s) on a channel after the wireless device performs the corresponding channel access procedure. In one aspect, for determining a COT, if a transmission gap between transmissions is less than or equal to a predetermined gap duration (e.g., 25 μs), the gap duration is counted in the COT. In one example, a base station (e.g., eNB or gNB) and a UE can share a COT for UL and DL transmissions between the base station and the UE.

A DL transmission burst (DL burst) is defined as a set of transmissions from a scheduling entity (e.g., base station, eNB, or gNB) without any gaps between transmissions greater than 16 μs. Transmissions from a scheduling entity separated by a gap of more than 16 μs are considered as separate DL transmission bursts. In other aspects, other suitable time gaps can be used to define a DL transmission burst. A scheduling entity can perform DL transmission(s) after a gap within a DL transmission burst without sensing the corresponding channel(s) for availability. A UL transmission burst is defined as a set of transmissions from a scheduled entity (e.g., UE) without any gaps greater than 16 μs. A UE can perform UL transmission(s) after a gap within an UL transmission burst without sensing the corresponding channel(s) for availability. Transmissions from a UE separated by a gap of more than 16 μs are considered as separate UL transmission bursts. In other aspects, other suitable time gaps can be used to define a DL transmission burst or UL transmission burst.

Channel Access Procedure Types

Figure 4:
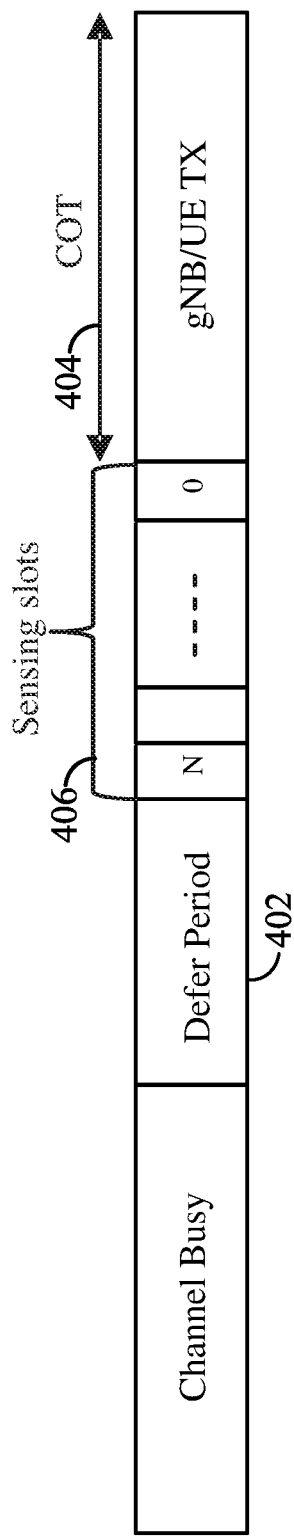
FIG. 4 is a schematic illustration of a first type of channel access procedure according to some aspects of the disclosure.

Two types of channel access procedures for NR-U are available (e.g., type 1 and type 2). In a type 1 channel access procedure, a wireless device (e.g., gNB or UE) performs the channel access procedure in a time duration spanned by a random number of sensing slots to determine or find an idle channel before transmission. FIG. 4 illustrates a first type (Type 1) of channel access procedure. After a defer period 402 following a busy channel, a wireless device may transmit (UL or DL transmission burst) in a COT 404 after first sensing the channel to be idle during a random number of sensing slots 406 (e.g., $m_p$ consecutive sensing slots) in a defer duration. FIG. 5 is a table illustrating some parameters that can be used in the type 1 channel access procedure for different channel access priority classes. For example, each channel access priority class (CAPC) has various parameters including a maximum contention window $CW_{max,p}$, a minimum contention window $CW_{min,p}$, a maximum channel occupancy time $T_{mcot,p}$, and a number of consecutive sensing slots $m_p$. These parameters have different values based on the CAPC (p). The wireless device may not transmit on a channel for a COT that exceeds $T_{mcot,p}$. The random number of sensing slots can be based on $CW_{min,p}$ and $CW_{max,p}$.

In the type 2 channel access procedure, a wireless device (e.g., gNB or UE) performs the channel access procedure in a time duration spanned by a deterministic number of sensing slots to determine an available (e.g., idle) channel before transmission. In some aspects, three kinds of type 2 channel access procedure are available: type 2A, type 2B, and type 2C.

FIG. 6A illustrates an exemplary type 2A sensing interval 602 that consists of two sensing slots 604. In a type 2A channel access procedure, a wireless device may transmit after sensing the channel to be available (e.g., idle) for at least a sensing interval of 25 μs. For example, the channel is considered to be available if the wireless device senses that the channel is idle in both sensing slots 604. In one aspect, the type 2A channel access procedure may be used when the gap between a DL transmission burst and a following UL transmission burst is greater than or equal to 25 μs, and when the gap between an UL transmission burst and a following DL transmission burst is equal to 25 μs.

FIG. 6B also illustrates an exemplary type 2B sensing interval 606 that consists of one sensing slot 608. In a type 2B channel access procedure, a wireless device may transmit after sensing the channel to be available (e.g., idle) within a sensing interval of at least 16 µs. In one aspect, the channel is considered to be available if the wireless device senses that the channel is idle in the sensing slot 608. In one example, the channel is available if the channel is sensed to be idle for a total of at least 5 µs with at least 4 µs of sensing occurring in the sensing slot 608. The type 2B channel access procedure may be used when the gap between a UL/DL transmission burst and a following UL/DL transmission burst is equal to 16 µs, and when the gap between an UL transmission burst and a following DL transmission burst is equal to 25 µs.

In a type 2C channel access procedure, a wireless device may transmit without first sensing the channel, unlike the type 2A and type 2B channel access procedures described above in relation to FIGS. 6A and 6B. For example, the type 2C channel access procedure may be used when the gap between an UL/DL transmission burst and a following UL/DL transmission burst is smaller than or equal to 16 µs, and a duration of the transmission burst is at most 584 µs. In this case, the wireless device can omit sensing the channel before transmission.

Scheduling Entity Initiated COT

Figure 7:
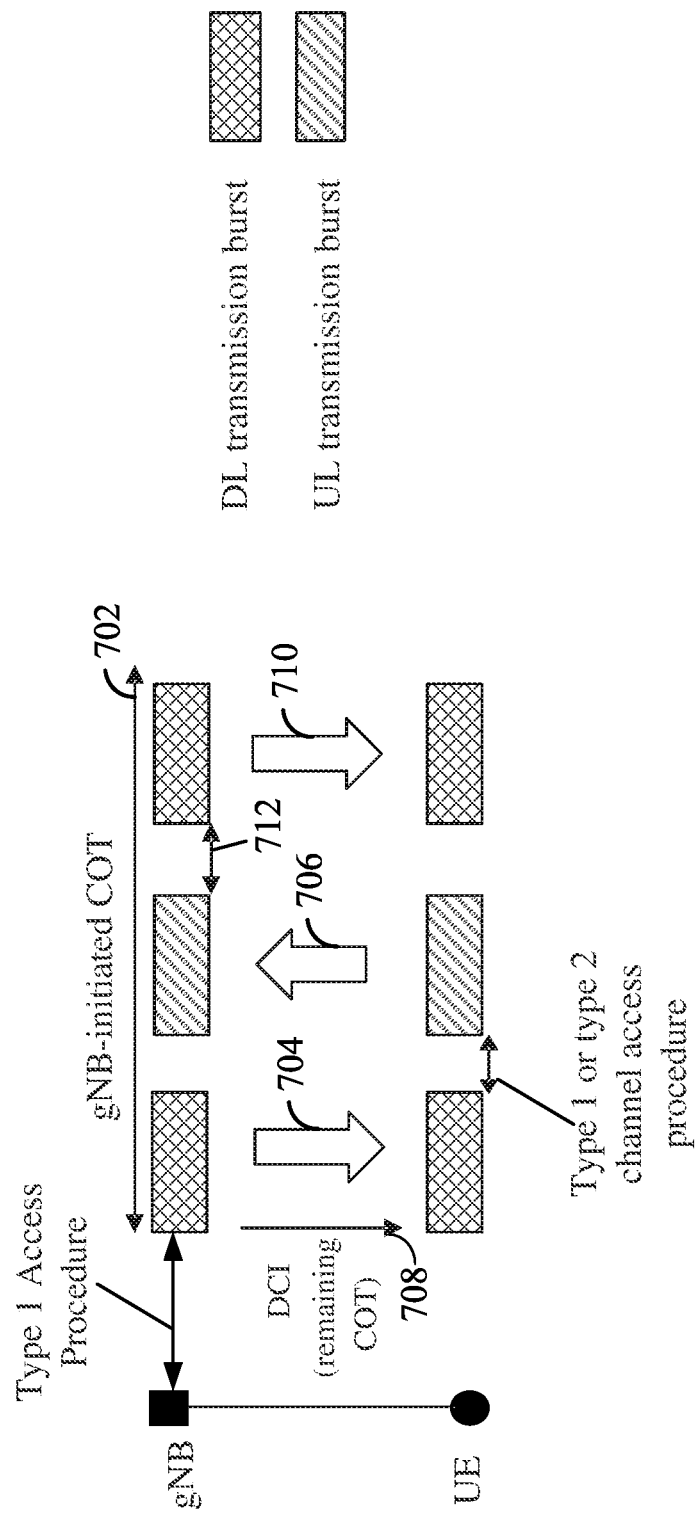
FIG. 7 is a diagram illustrating an exemplary channel access procedure using a channel occupancy time (COT) initiated by a scheduling entity according to some aspects of the disclosure.

FIG. 7 is a diagram illustrating a channel occupancy time (COT) 702 that is initiated by a network access node (e.g., scheduling entity, gNB, or base station) for a DL transmission burst (e.g., DL transmission burst 704 in FIG. 7) using a type 1 channel access procedure. In one aspect, a scheduling entity can share the COT 702 with a UE that can transmit an UL transmission burst 706 including uplink control information and/or uplink data in the same COT 702 using a type 1 or type 2 channel access procedure when certain conditions are met (e.g., remaining time in the COT after the first DL transmission burst 704). In some aspects, the UE can determine the remaining time of the COT 702 initiated by the scheduling entity based on downlink control information 708 (e.g., DCI in FIG. 7) that is transmitted by the scheduling entity. For example, the downlink control information 708 (e.g., DCI 2_0) can carry an SFI (slot format indication) that is extended to carry COT sharing information (e.g., described in Release 16 of the 3GPP NR specification). The UE may determine the remaining time of the COT based on the COT sharing information (e.g., COT start time and duration).

In some aspects, the scheduling entity sends an uplink (UL) grant (e.g., in a DCI 0_0 or DCI 0_1 for a PUSCH) or a downlink (DL) assignment (e.g., in a DCI 1_0 or DCI 1_1 for an ACK/NACK carried in a PUCCH) to indicate or signal the channel access type to be used by the UE for the UL transmission burst. In one aspect, the scheduling entity may indicate a type 1 or type 2 (e.g., type 2A/2B/2C) channel access procedure for the UL transmission burst via an UL grant. In some aspects, the UE can determine autonomously to switch from the type 1 channel access procedure, which is indicated by the scheduling entity, to a type 2 (e.g., type 2A/2B/2C) channel access procedure when certain conditions (e.g., DL-to-UL gap and COT remaining time) are met. In one example, the UE can use a type 2 channel access procedure if the UL transmission burst (e.g., UL transmission burst 706 in FIG. 7) is within the scheduling entity initiated COT 702. In some aspects, it is determined by UE implementation whether to use type 1 or type 2 channel access procedure for the UL transmission burst. For example, the UE can decide whether it is qualified to perform a type 1-to-type 2 switch based on certain conditions. (e.g., the channel access type switch occurs within the COT initiated by the scheduling entity). In some examples, if the UE is qualified for a type 1-to-type 2 switch, the UE can decide whether or not to make the switch based on a UE-specific implementation algorithm. In some aspects, after the UL transmission burst 706, the scheduling entity can transmit additional DL transmission bursts (e.g., transmission burst 710) using the type 2 channel access procedure within the COT 702 if the UL-DL gap 712 can meet certain conditions.

UE Initiated COT

Figure 8:
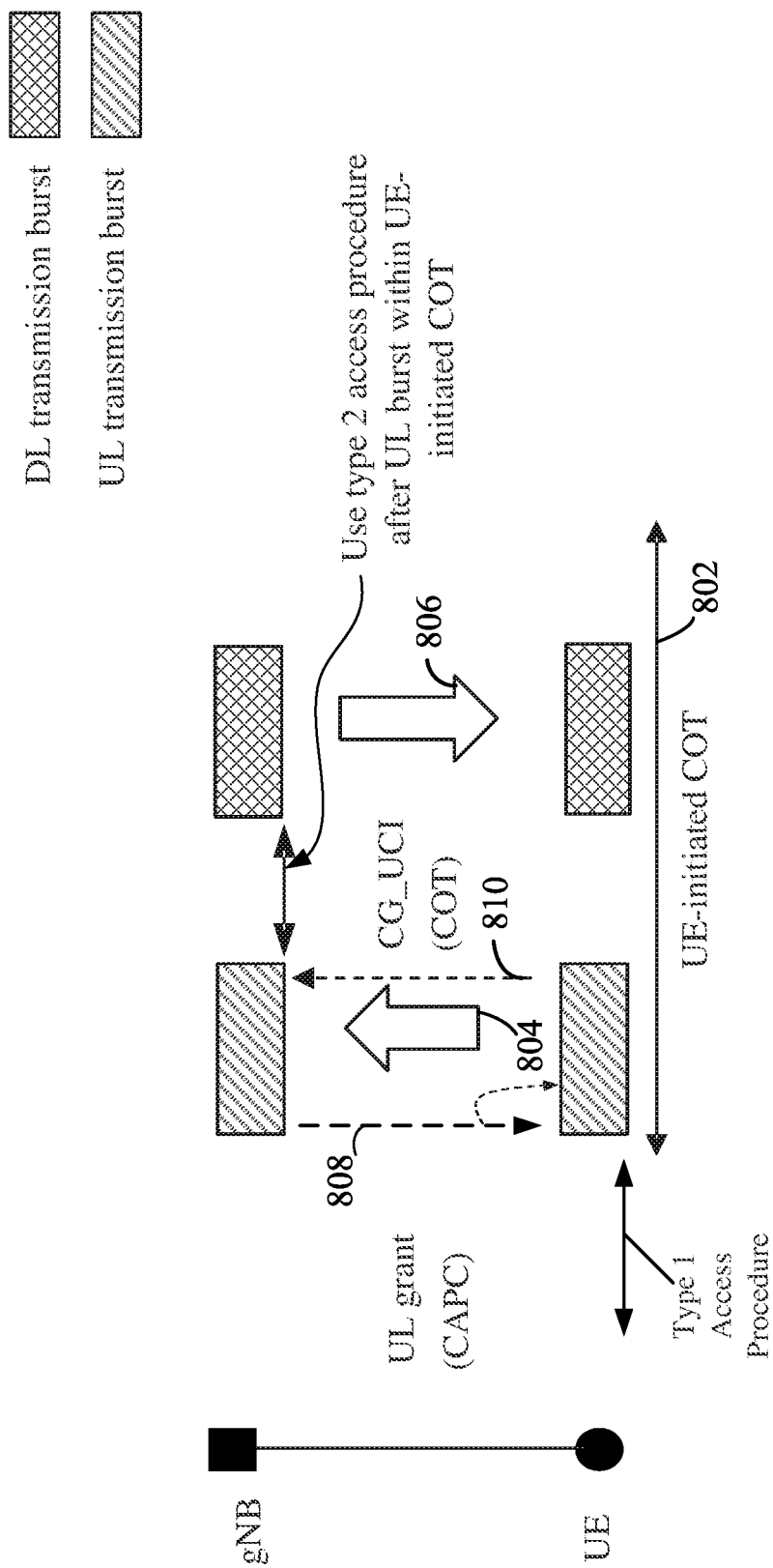
FIG. 8 is a diagram illustrating an exemplary channel access procedure using a COT initiated by a user equipment (UE) according to some aspects of the disclosure.

FIG. 8 is a diagram illustrating a COT 802 initiated by a UE using a type 1 channel access procedure. The UE can share the COT 802 after an UL transmission burst (e.g., UL transmission burst 804) with a network access node (e.g., scheduling entity or gNB) for a DL transmission burst (e.g., DL transmission burst 806). A scheduling entity can decide autonomously to use a type 2 channel access procedure for the DL transmission burst if the DL transmission burst is within the UE-initiated COT 802, and a UL-to-DL gap condition is met. In one example, for a type 2A channel access procedure, the UL-to-DL gap condition is met if the gap between the UL transmission burst and DL transmission burst is equal to 25 µs. In one example, for a type 2B channel access procedure, the UL-to-DL gap condition is met if the gap between the UL transmission burst and DL transmission burst is equal to 16 µs. In another example, for a type 2C channel access procedure, the UL-to-DL gap condition is met if the gap between the UL transmission burst and DL transmission burst is smaller than or equal to 16 µs. Because the scheduling entity controls DL/UL communication with the UE, the scheduling entity can control the gap between UL and DL transmission bursts. Therefore, the scheduling entity may autonomously select a type 2 channel access procedure or not when any of the above-described UL-to-DL gap conditions are met.

In one aspect, if the UE-initiated COT 802 is used for a scheduled UL transmission burst via a dynamic DCI grant, the scheduling entity can indicate the channel access priority class (CAPC) in an UL grant 808, and the corresponding maximum COT can be determined according to the CAPC. In some examples, the CAPC may be defined in the specification (e.g., CAPC table in FIG. 5) of a wireless communication standard (e.g., 5G NR). Because the scheduling entity (e.g., gNB) can control the communication with the UE, the scheduling entity can determine the remaining COT after the UL transmission burst 804. In one aspect, if the UE-initiated COT is used for a configured UL transmission burst via a configured UL grant, the UE can indicate the remaining COT to the scheduling entity via a configured grant uplink control information (CG-UCI) 810. An example of the configured UL transmission burst may be a semi-static UL transmission burst, e.g., PRACH, PUCCH, SRS, and semi-persistent scheduled PUSCH.

Figure 9:
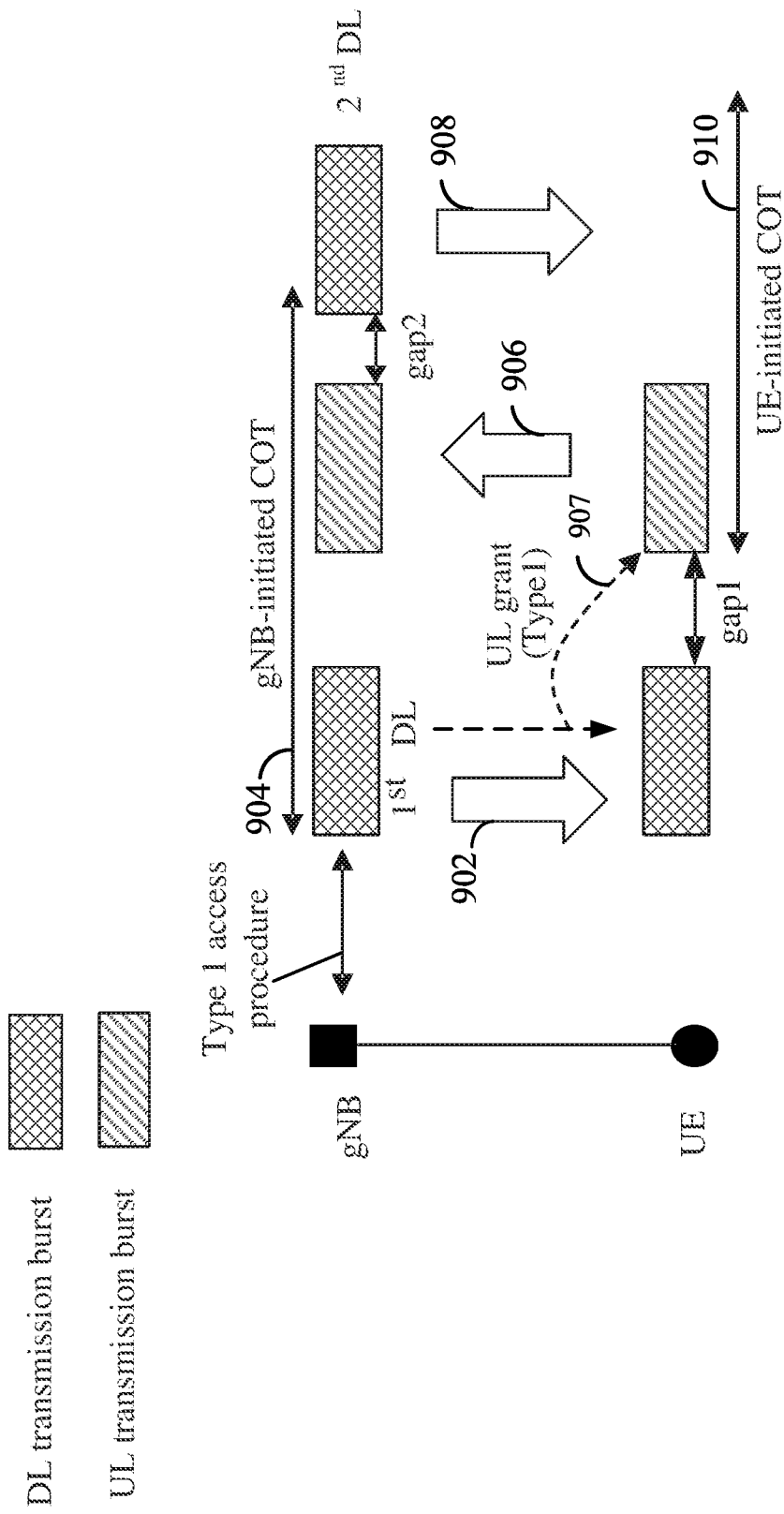
FIG. 9 is a diagram illustrating an exemplary channel access procedure using a gNB-initiated COT for a downlink transmission burst and a UE-initiated COT for an uplink transmission burst according to some aspects of the disclosure.

FIG. 9 is a diagram illustrating a first COT initiated by a scheduling entity (e.g., gNB) and a second COT initiated by a UE according to some aspects. The scheduling entity can transmit a first DL transmission burst (e.g., DL transmission burst 902) in the first COT (e.g., gNB-initiated COT 904). Within the first COT 904, the scheduling entity can signal a UE to use a type 1 channel access procedure for an UL transmission burst (e.g., UL transmission burst 906) after the first DL transmission burst 902. For example, the scheduling entity may transmit an UL grant 907 that indicates a type 1 channel access procedure. However, in some aspects, the UE can still switch from a type 1 to a type 2 (e.g., type 2A) channel access procedure for the UL transmission burst 906 depending on UE implementation. This information (type 1-to-2 switch) is unknown to the scheduling entity in the current NR communication specification. In this case, the scheduling entity cannot determine whether the UE uses the type 1 or type 2 channel access procedure for the UL transmission burst. Therefore, even if the UE uses a type 1 channel access procedure to initiate a COT 910 for the UL transmission burst, and a second DL transmission burst (e.g., DL transmission burst 908) is within the UE-initiated COT; the scheduling entity cannot use a type 2 channel access procedure for the second DL transmission burst 908, even if the second DL transmission burst 908 is outside the first initiated COT 904 or if the gap (gap 1) between the first DL transmission burst 902 and UL transmission burst 906 is greater than 25 μs.

In some aspects, the scheduling entity can include a predetermined condition in the DL indication or DL control information (e.g., UL grant 907), and, based on the predetermined condition, the UE can determine whether to use a type 1 or type 2 channel access procedure for the UL transmission burst (e.g., UL transmission burst 906). For example, the UE can use the type 2 channel access procedure if the UL transmission burst can satisfy the predetermined condition. In some aspects, the predetermined condition may be known to the UE, for example, defined in a communication standard specification (e.g., 5G NR specification) and need not be included in the control information by the scheduling entity. More details of the predetermined condition and related processes will be described in more detail below in relation to FIG. 14.

UE Signaling for Indicating Channel Access Procedure Type for UL Transmission

Figure 10:
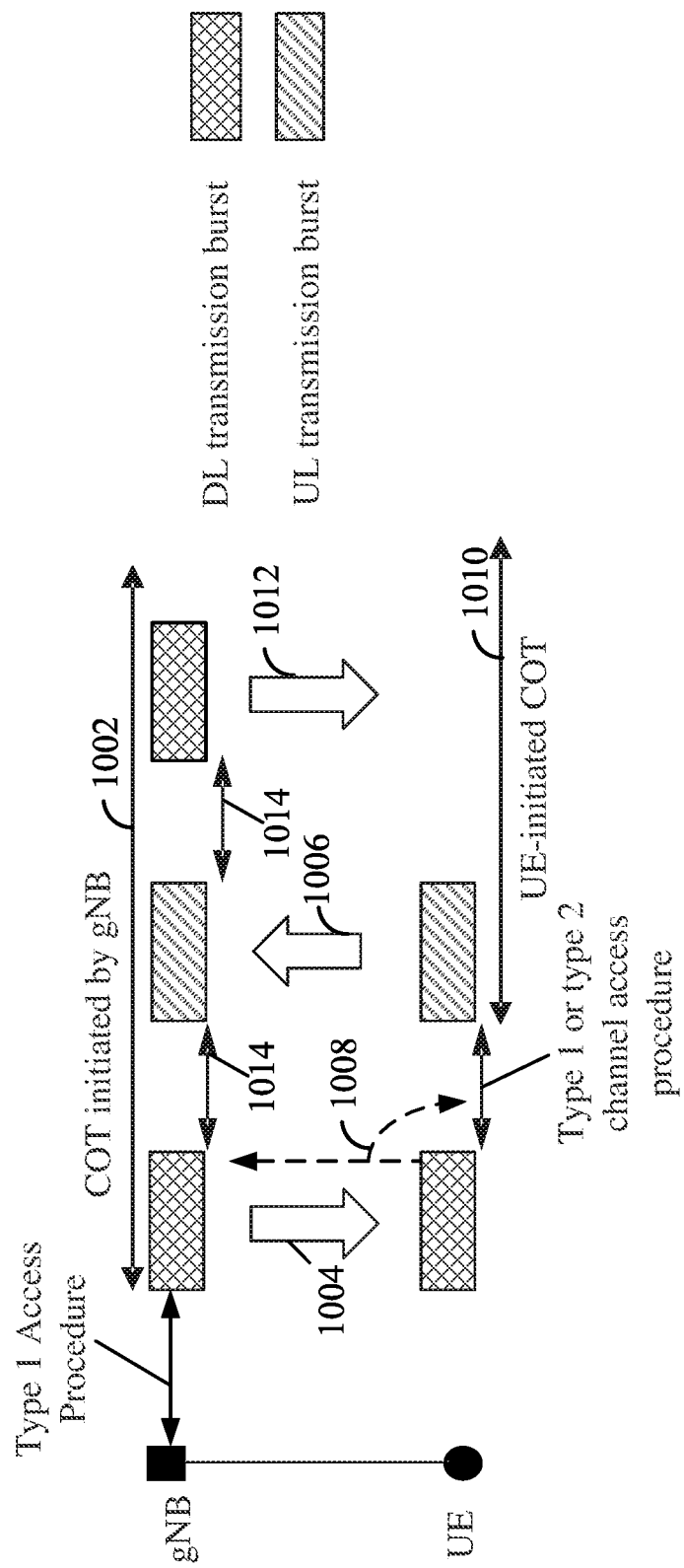
FIG. 10 is a diagram illustrating an exemplary channel access procedure using UE signaling for indicating a channel access procedure type according to some aspects.

FIG. 10 is a diagram illustrating a channel access procedure using UE signaling for indicating a channel access procedure type according to some aspects. A scheduling entity (e.g., gNB) can initiate a first COT 1002 using a type 1 channel access procedure and transmit a DL transmission burst 1004. The scheduling entity can indicate (e.g., UL grant) or request a UE to use a type 1 channel access procedure for transmitting an UL transmission burst 1006 in the first COT 1002 initiated by the scheduling entity. In some aspects, the UE can transmit UL control signaling 1008 to the scheduling entity to indicate whether or not the UE has switched from a type 1 to a type 2 channel access procedure for the UL transmission burst (e.g., UL transmission burst 1006) in the first COT 1002. That is, the UL control signaling 1008 can indicate whether the UE performed a type 1 or type 2 channel access procedure for the UL transmission burst 1006. In some examples, the UL control signaling 1008 may be uplink control information (UCI) carried on PUCCH/PUSCH, UL medium access control (MAC) control element (CE), UL reference signal, associated resources and configurations, or any combination. In some aspects, the UL control signaling 1008 can be a one-time indication (e.g., for a single UL transmission burst), valid until being further updated by a next update, or valid for a specified time period (e.g., predetermined duration). In some aspects, the UE can always send the control signaling 1008 to indicate the channel access type used. In some aspects, the UE can send the control signaling 1008 to indicate the channel access type used for the UL transmission burst only when the UE switches from the indicated channel access type (e.g., type 1) to a different channel access type (e.g., type 2A/2B/2C).

In one aspect, if the scheduling entity can determine that the UE used a type 1 channel access procedure for the UL transmission burst 1006 (i.e., no type switching), based on current NR COT sharing rules, the scheduling entity can use a type 2 channel access procedure for a second DL transmission burst (e.g., DL transmission burst 1012) within a second COT 1010 initiated by the UE if the gap 1014 between the UL transmission burst 1006 and the following DL transmission burst 1012 is not greater than 16 μs or equal to 25 μs after the previous UL transmission burst 1006. When the scheduling entity can determine that the UE has switched from a type 1 to a type 2 channel access procedure for an UL transmission burst 1006, based on current NR COT sharing rules, the scheduling entity can use a type 2 channel access procedure for the second DL transmission burst 1012 with a UL-to-DL gap no greater than 16 μs or equal to 25 μs after the previous UL transmission burst only if the following condition is met. The condition is that the second DL transmission burst (e.g., DL transmission burst 1012) is within the scheduling entity-initiated COT 1002 for the first DL transmission burst (e.g., DL transmission burst 1004), and the gap 1014 between the first DL transmission burst and UL transmission burst is no greater than 25 μs.

UE Signaling for Requesting Channel Access Procedure Type for DL Transmission

Figure 11:
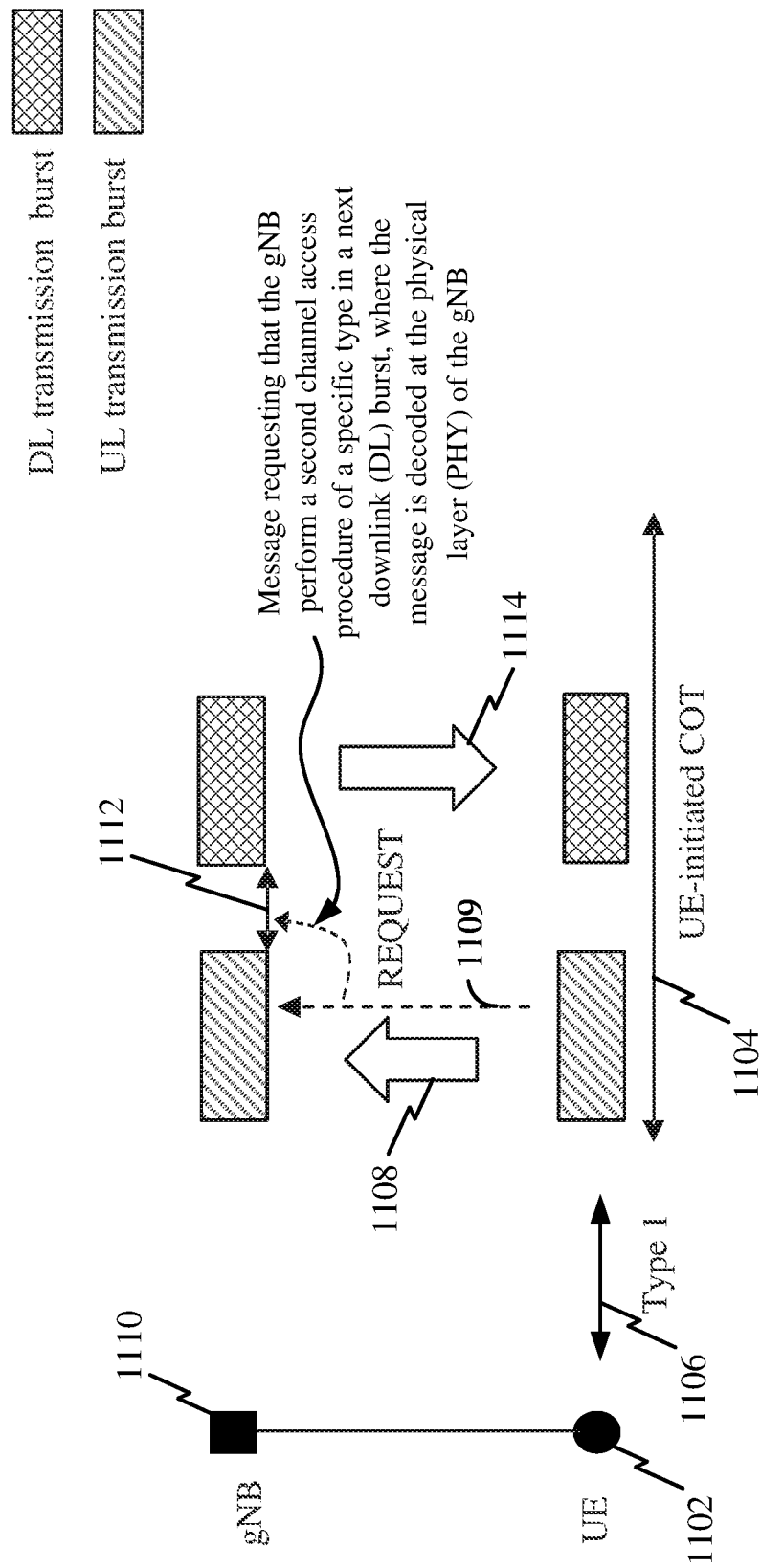
FIG. 11 is a diagram illustrating an exemplary channel access procedure using UE signaling for requesting a channel access procedure type according to some aspects of the disclosure.

FIG. 11 is a diagram illustrating a first COT 1104 initiated by a UE 1102 (e.g., a scheduled entity, a wireless communication device) according to some aspects of the disclosure. The UE 1102 can initiate the first COT 1104 by performing a first channel access procedure 1106 of a first type (e.g., type 1 channel access procedure). The UE 1102 may transmit a first uplink transmission burst (e.g., UL transmission burst 1108) during the first COT 1104. FIG. 11 graphically depicts the UE 1102 adding a message 1109, including a control indication, to the UL transmission burst 1108. In some aspects, the UE may transmit the message 1109 separately. The message may request that a scheduling entity (e.g., gNB 1110) performs a second channel access procedure 1112 of the first type or a second type (e.g., type 2A/2B/2C) in a next DL transmission burst 1114. In some aspects, the message 1109 may be decoded, and acted upon, at the physical layer (PHY) of the scheduling entity (e.g., gNB 1110).

Figure 12:
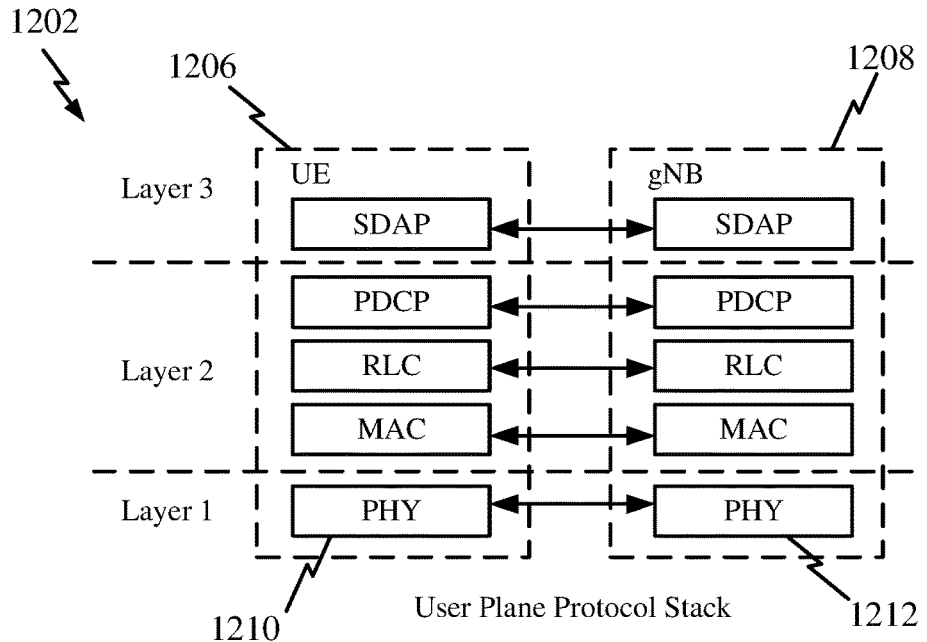
FIG. 12 is a schematic depiction of a 5G user plane protocol stack and a 5G control plane protocol stack according to some aspects of the disclosure.
Figure 12:
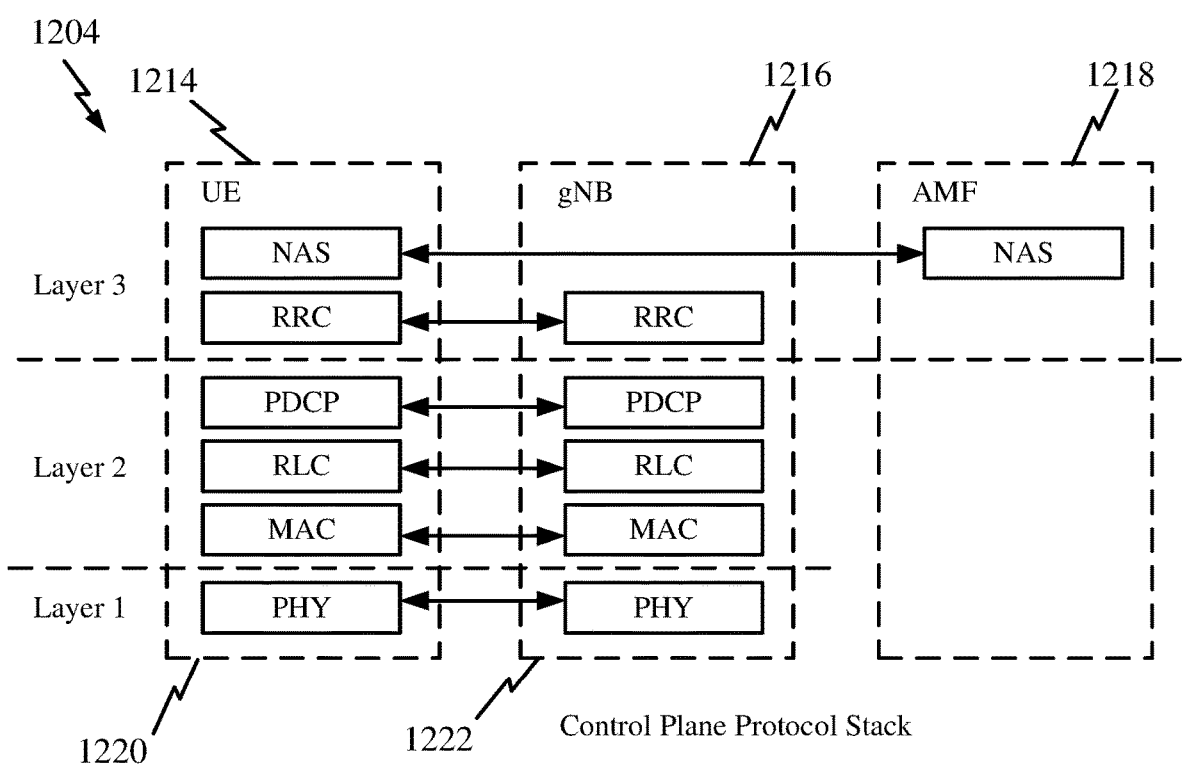

FIG. 12 is a schematic depiction of a 5G user plane protocol stack 1202 and a 5G control plane protocol stack 1204 according to some aspects of the disclosure. The user plane protocol stack 1202 depicts a first protocol stack 1206 of a UE and a second protocol stack 1208 of a gNB or scheduling entity. The first and second protocol stacks include the following layers: physical (PHY), medium access control (MAC), radio link control (RLC), packet data convergence protocol (PDCP), and service data adaptation protocol (SDAP). The functions of each of the layers are well known and will not be presented herein for the sake of brevity. Notably, the PHY layer is often referred to as Layer 1, and the MAC, RLC, and PDCP layers are often referred to as Layer 2. The SDAP layer may be referred to as Layer 3.

The control plane protocol stack 1204 depicts a third protocol stack 1214 of the UE, and fourth protocol stack 1216 of the gNB, and a fifth protocol stack 1218 of the access and mobility management function (AMF). The third protocol stack 1214 of the UE includes the following layers: physical (PHY), medium access control (MAC), radio link control (RLC), packet data convergence protocol (PDCP), radio resource control (RRC), and non-access stratum (NAS). The fourth protocol stack 1216 of the gNB includes the following layers: physical (PHY), medium access control (MAC), radio link control (RLC), packet data convergence protocol (PDCP), and radio resource control (RRC). The fifth protocol stack 1218 of the AMF includes a non-access stratum (NAS) layer. As with the user plane protocol stack 1202, the functions of each of the layers are well known and will not be presented herein for the sake of brevity. Notably, the PHY layer is again referred to as Layer 1, the MAC, RLC, and PDCP layers are again referred to as Layer 2. The NAS layer may be referred to as Layer 3.

According to aspects described herein, messages including control and traffic may be passed from the UE to the gNB in the PHY layer, Layer 1. According to aspects herein, the gNB may process the messages at the PHY layer, which is at Layer 1. Processing of the messages at the PHY layer, that is at Layer 1, permits the gNB to reduce the amount of time it takes to react to the message in comparison to, for example, an amount of time it would take to react to the message had the message been passed to a higher layer (e.g., the MAC layer) for processing. Faster processing time (less reaction time) leads to efficiencies that can be realized by the wireless communication device, as the message, that may for example serve to extend the COT of a UE initiated communication are processed expeditiously, thereby avoiding delays that might be caused if the COT expired and the wireless communication device needed to again perform a channel access procedure to again gain access to an uplink channel.

In some aspects of the disclosure, a wireless communication device (e.g., UE) may perform a first channel access procedure of a first type (e.g., type 1, type 2A/2B/2C) to initiate a first channel occupancy time (COT) to a communication channel. The wireless communication device may add a control indication (e.g., message 1109), which requests a network access node (e.g., gNB or scheduling entity) to perform a second channel access procedure of a second type (e.g., type 1) in a next downlink (DL) transmission burst. The control indication may be carried in a message configured to be processed at a PHY of the network access node. Processing the message at the PHY of the network access node allows the network access node to react to the message faster than if the message had been passed to a higher layer, such as the MAC layer. According to aspects herein, the wireless communication device (e.g., UE) may transmit the message to the network access node (e.g., gNB) in an uplink (UL) transmission burst during a first COT of a UE initiated COT on a communication channel.

Figure 13:
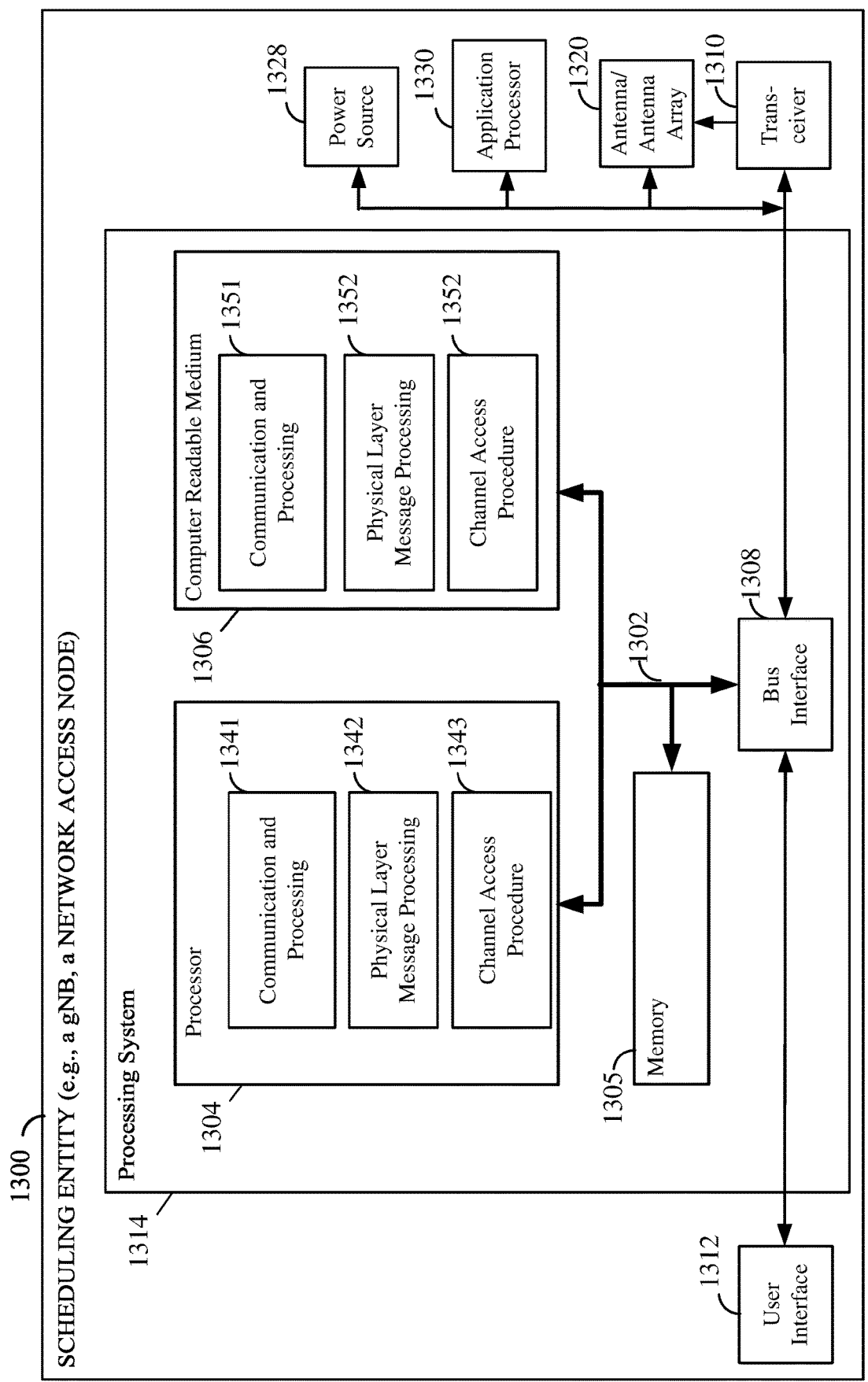
FIG. 13 is a block diagram illustrating an example of a hardware implementation for a scheduling entity according to some aspects of the disclosure.

FIG. 13 is a block diagram illustrating an example of a hardware implementation for a scheduling entity 1300 employing a processing system 1314. For example, the scheduling entity 1300 may be a base station or network access node as illustrated in any one or more of FIGS. 1, 2, 7-11, and/or 19-22.

The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated herein, for example, in FIGS. 14, 15, 21, and 22.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further.

A bus interface 1308 provides an interface between the bus 1302 and a transceiver 1310. The transceiver 1310 provides a communication interface or a means for communicating with various other apparatus over a transmission medium (e.g., air interface). The transceiver 1310 may further be coupled to one or more antennas/antenna array 1320. The bus interface 1308 further provides an interface between the bus 1302 and a user interface 1312 (e.g., keypad, display, touch screen, speaker, microphone, control features, etc.). Of course, such a user interface 1312 is optional, and may be omitted in some examples. In addition, the bus interface 1308 further provides an interface between the bus 1302 and a power source 1328, and between the bus 1302 and an application processor 1330, which may be separate from a modem (not shown) of the scheduling entity 1300 or processing system 1314.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions, including, for example, signaling and controlling channel access procedure in wireless communication using unlicensed spectrum. For example, the circuitry may be configured to implement one or more of the functions described herein in relation to FIGS. 14, 15, 21, and 22.

In some aspects of the disclosure, the processor 1304 may include communication and processing circuitry 1341 configured for various functions, including for example communicating with a network core (e.g., a 5G core network), scheduled entities (e.g., UE), or any other entity, such as, for example, local infrastructure or an entity communicating with the scheduling entity 1300 via the Internet, such as a network provider. In some examples, the communication and processing circuitry 1341 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1341 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1341 may further be configured to execute communication and processing software 1351 stored on the computer-readable medium 1306 to implement one or more functions described herein.

In some aspects of the disclosure, the processor 1304 may include physical layer message processing circuitry 1342 configured for various functions, including, for example, processing a message at a physical layer (PHY) of the scheduling entity. In some examples, the physical layer message processing circuitry 1342 may include one or more hardware components that provide the physical structure that performs processes related to processing the message at a physical layer (PHY) of the scheduling entity. The physical layer message processing circuitry 1342 may further be configured to execute physical layer message processing software 1352 stored on the computer-readable medium 1306 to implement one or more functions described herein.

In some aspects of the disclosure, the processor 1304 may include channel access procedure circuitry 1343 configured for various functions, including, for example, processing a received message that includes a control indication requesting the scheduling entity to perform a first channel access procedure of a first type in a next downlink (DL) transmission burst. In some examples, the channel access procedure circuitry 1343 may include one or more hardware components that provide the physical structure that performs processes related to processing the received message that includes the control indication requesting the scheduling entity to perform the first channel access procedure of the first type in a next downlink (DL) transmission burst.

In some aspects, the channel access procedure circuitry 1343 can be configured for processing a control indication to be transmitted to a UE. The control indication includes a predetermined condition for a UE to determine whether to use a type 1 or type 2 channel access procedure for an UL transmission burst (e.g., UL transmission burst). In some examples, the channel access procedure circuitry 1343 may include one or more hardware components that provide the physical structure that performs processes related to processing the control indication that includes the predetermined condition for the UE to determine whether to use a type 1 or type 2 channel access procedure for an UL transmission burst or UL transmission burst.

In some aspects, the channel access procedure circuitry 1343 can be configured for determining whether the UE has performed a type 1 or type 2 channel access procedure for an UL transmission burst based on whether or not the UL transmission burst satisfies the predetermined condition previously indicated by the scheduling entity or an uplink indication received from the UE. In some examples, the channel access procedure circuitry 1343 may include one or more hardware components that provide the physical structure that performs processes related to determining whether the UE has performed a type 1 or type 2 channel access procedure for an UL transmission burst based on whether or not the UL transmission burst satisfies the predetermined condition previously indicated by the scheduling entity or an uplink indication received from the UE. The channel access procedure circuitry 1343 may further be configured to execute channel access procedure software 1353 stored on the computer-readable medium 1306 to implement one or more functions described herein.

UL Channel Access Type Switching Based on Predetermined Condition Indication

Figure 14:
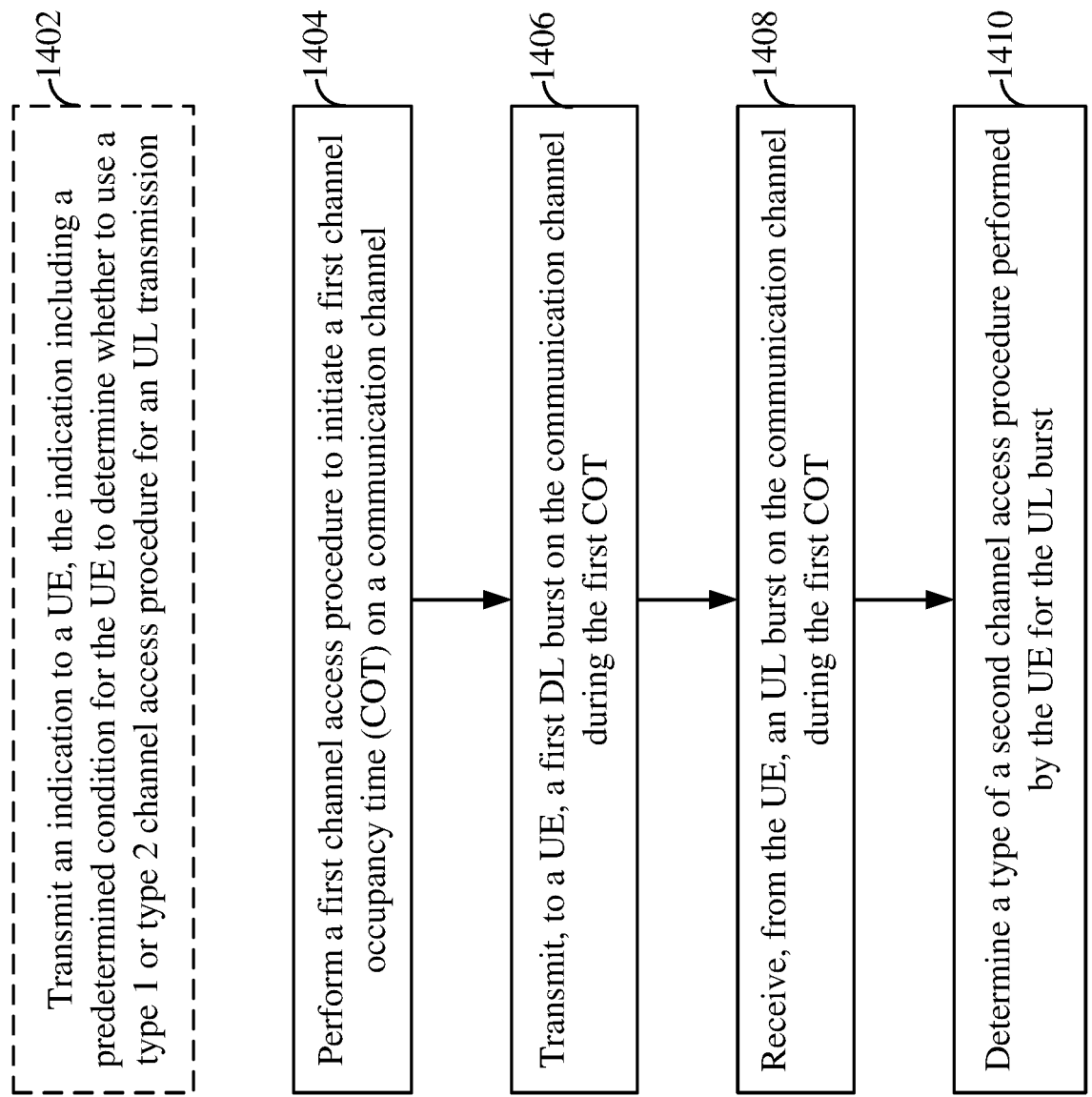
FIG. 14 is a flow chart illustrating an exemplary process for wireless communication at a scheduling entity using an unlicensed spectrum according to some aspects of the present disclosure.

FIG. 14 is a flow chart illustrating an exemplary process 1400 for wireless communication using an unlicensed spectrum according to some aspects of the present disclosure. As described below, some or all illustrated features may be omitted in a particular implementation within the scope of the present disclosure, and some illustrated features may not be required for the implementation of all examples. In some examples, the process 1400 may be carried out by the scheduling entity 1300 illustrated in FIG. 13 in a communication network using an unlicensed spectrum (e.g., NR-U). In some examples, the process 1400 may be carried out by any suitable apparatus (e.g., network access node or gNB) or means for carrying out the functions or algorithm described below.

At block 1402, a scheduling entity (e.g., gNB) can transmit an indication to a UE. The indication can include a predetermined condition for the UE to determine whether to use a type 1 or type 2 channel access procedure for an UL transmission burst (e.g., UL transmission burst). In one aspect, the channel access procedure circuitry 1343 can provide a means for preparing the indication including the predetermined condition. In one aspect, the communication and processing circuitry 1341 and transceiver 1310 can provide a means for transmitting the indication to the UE via the antenna 1320. In some aspects, the scheduling entity can transmit the indication with the predetermined condition to the UE using one or more of: a DL RRC message, a DL medium access control (MAC) control element (CE), a dynamic DCI with DL or UL grant, an UL grant in a random access channel (RACH) response, and/or a PDCCH order.

In some aspects, the predetermined condition may include one or more parameters: channel access priority class (CAPC) or quality-of-service (QoS) traffic type of the UL transmission, channel types, transmission configuration indicator (TCI) states, resource pattern, and buffer status. The scheduling entity may use different configurations with different values of the associated parameters in the indication. In some aspects, the predetermined condition may be defined in a communication standard (e.g., 5G NR) and known to the UE, and the scheduling entity does not need to transmit the predetermined condition to the UE.

Some exemplary channel types are PUCCH, PUSCH, PRACH, and SRS. The TCI state may include parameters for configuring the spatial quasi-co-location (QCL) of different beams for UL transmission. If a resource pattern of the upcoming UL transmission burst has a relatively short duration (e.g., 1 slot), the scheduling entity may configure the UE to use the type 2 channel access procedure whenever the upcoming UL transmission burst is within a COT initiated by the scheduling entity. If a resource pattern of the upcoming UL transmission burst has a relatively long duration (e.g., multiple slots), the scheduling entity may indicate or configure the UE to switch from a type 1 to a type 2 channel access procedure, and let the UE decide whether to use the type 1 or type 2 channel access procedure. In one example, the scheduling entity may indicate or configure the UE to use the type 2 channel access procedure (i.e., type switching) when the upcoming UL transmission burst (e.g., UL transmission burst 906) is within the COT initiated by the scheduling entity, and if the upcoming UL transmission burst includes low latency traffic with an amount of data in an UL buffer below a threshold. In another example, the scheduling entity may configure the UE to use type 1 channel access procedure (i.e., no switching to type 2) if the UE has best effort traffic with an amount of data in an UL buffer above a threshold.

At block 1404, the scheduling entity can perform a first channel access procedure (e.g., type 1 channel access procedure) to initiate a first channel occupancy time (COT) on a communication channel (e.g., a DL channel). In one aspect, the channel access procedure circuitry 1343 can provide a means to perform the first channel access procedure to initiate the first COT (e.g., COT 904 in FIG. 9) on a channel using an unlicensed band (e.g., NR-U). In one example, in the first channel access procedure (e.g., type 1), the scheduling entity can sense the channel in a time duration spanned by a random number of sensing slots (e.g., sensing slot 406) to determine whether the channel is available (e.g., idle).

At block 1406, the scheduling entity can transmit a first DL transmission burst (e.g., DL transmission burst) to the UE on the communication channel during the first COT. In one aspect, the communication and processing circuitry 1341 can provide a means for transmitting the first DL transmission burst (e.g., DL transmission burst 902 in FIG. 9) to the UE via the transceiver 1310. In one example, the DL transmission burst may include a PDCCH and/or a PDSCH.

At block 1408, the scheduling entity can receive an UL transmission burst (e.g., UL transmission burst) from the UE on the communication channel during the first COT. In one aspect, the communication and processing circuitry 1341 can provide a means for receiving an UL transmission burst (e.g., UL transmission burst 906 in FIG. 9) from the UE via the transceiver 1310. In one example, the UL transmission burst may include a PUCCH and/or a PUSCH.

At block 1410, the scheduling entity can determine a type of a second channel access procedure performed by the UE for the UL transmission burst. For example, the scheduling entity can determine whether the UE has performed the type 1 channel access procedure or a type 2 channel access procedure for the UL transmission burst based on at least one of: whether or not the UL transmission burst satisfies the predetermined condition previously indicated by the scheduling entity; or an uplink indication received from the UE. In one aspect, the channel access procedure circuitry 1343 can provide a means for determining whether the UE has used type 1 or type 2 channel access procedure for the UL transmission burst based on, for example, the CAPC or QoS traffic type of the UL transmission burst, channel types, TCI states, resource pattern, and/or buffer status of the UE.

In one aspect, the scheduling entity can receive an uplink indication (e.g., control signaling 1008) that indicates whether the UE has performed the type 1 or type 2 channel access procedure for the UL transmission burst. In one aspect, the channel access procedure circuitry 1343 can provide a means for determining whether or not the UL transmission burst met the predetermined condition. In one example, in the type 2 channel access procedure, the UE senses the communication channel in a time duration spanned by a deterministic number of sensing slots (e.g., time slots 604 and 608) to determine whether or not the channel is idle or available before transmission. For example, the type 2 channel access procedure may be a type 2A, type 2B, or type 2C channel access procedure as described above.

Figure 15:
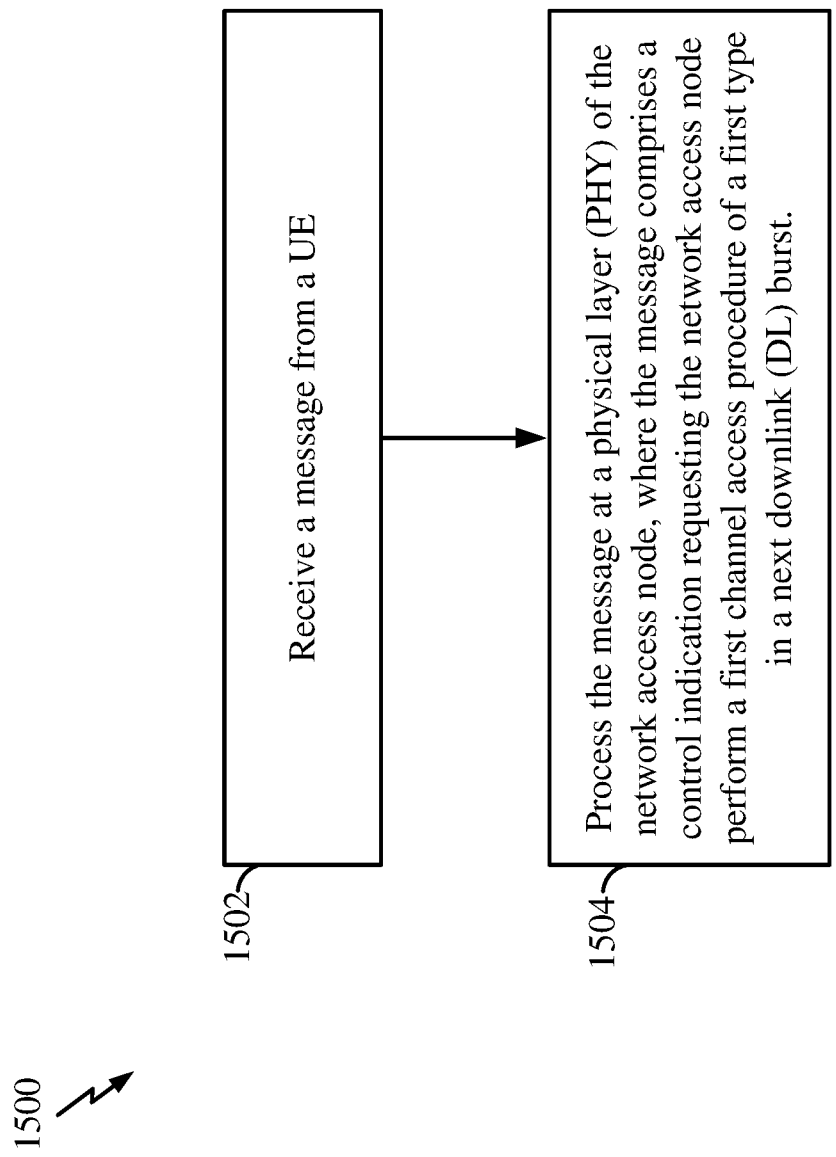
FIG. 15 is a flow chart illustrating an exemplary process at a scheduling entity for supporting signaling of a requested channel access type in wireless communication according to some aspects of the present disclosure.

FIG. 15 is a flow chart illustrating an exemplary process 1500 at a network access node (e.g., scheduling entity or gNB) for supporting signaling of a requested channel access type in shared or unlicensed spectrum (e.g., NR-U) in accordance with some aspects of the present disclosure. The wireless communication may be performed in an unlicensed spectrum; however, the exemplary process 1500 may also be applicable to communication in a licensed spectrum (e.g., 5G NR). As described below, some or all illustrated features may be omitted in a particular implementation within the scope of the present disclosure, and some illustrated features may not be required for implementation of all examples. In some examples, the process 1500 (e.g., a method) may be carried out by the scheduling entity 1300 illustrated in FIG. 13. In some examples, the process 1500 may be carried out by any suitable apparatus or means for carrying out the functions or algorithm described below.

At block 1502, a network access node (e.g., a base station, an eNB, a gNB, a scheduling entity) may receive a message from a wireless communication device (e.g., UE). According to some aspects, the network access node may receive the message during a channel occupancy time (COT) initiated by the wireless communication device. In one aspect, the communication and processing circuitry 1341 can provide a means for receiving the message (e.g., message 1109 of FIG. 11) from the wireless communication device during a UE-initiated COT 1104.

At block 1504, the network access node may process the message at a physical layer (PHY) of the network access node, where the message may include a control indication (e.g., message 1109) requesting the network access node to perform a first channel access procedure of a first type in a next downlink (DL) transmission burst (e.g., DL transmission burst 1114). In one aspect, the channel access procedure circuitry 1343 can provide a means for processing the message from the wireless communication device.

According to some aspects, the first type of channel access procedure may be a type 1, a type 2A, a type 2B, or a type 2C channel access procedure. In some aspects, the network access node may perform, upon receiving the message, the requested first channel access procedure of the first type in the next downlink (DL) transmission burst if at least one condition is met. In other words, the network access node (e.g., gNB 1110) may perform the requested channel access type upon reception of the message if the associated condition is met. By way of example, a specification may define that the network access node should perform the requested channel access procedure upon reception of this message from the wireless communication device.

According to other aspects, the network access node may selectively perform (e.g., perform or not perform), upon receiving the message, the requested first channel access procedure of the first type based on an implementation (or configuration) of the network access node in the next downlink (DL) transmission burst if the at least one condition is met. In other words, the network access node may or may not perform the requested channel access procedure of the first type based on the network access node's implementation (or configuration) upon reception of the message (e.g., a final decision is made at the network access node in response to the request from the wireless communication device). In still other words, the request from the wireless communication device may be a suggestion, and it may be up to an implementation or a configuration of the network access node to decide whether to perform the requested channel access procedure of the first type upon reception of the message from the wireless communication device.

According to some aspects, the message may further include at least one condition. By way of example, a plurality of conditions is described above in connection with an exemplary wireless communication device and/or processes related thereto. The same conditions are applicable to the network access node and will not be repeated for the sake of brevity. In an example where the message includes at least one condition, the network access node may further, for example, perform at least one of: the first channel access procedure of the first type (e.g., type 1) in the next downlink (DL) transmission burst if the at least one condition is met; or the first channel access procedure of a type (e.g., type 1 or type 2) requested by the wireless communication device (e.g., UE) or determined by the network access node in the next downlink (DL) transmission burst if the at least one condition is met.

Figure 16:
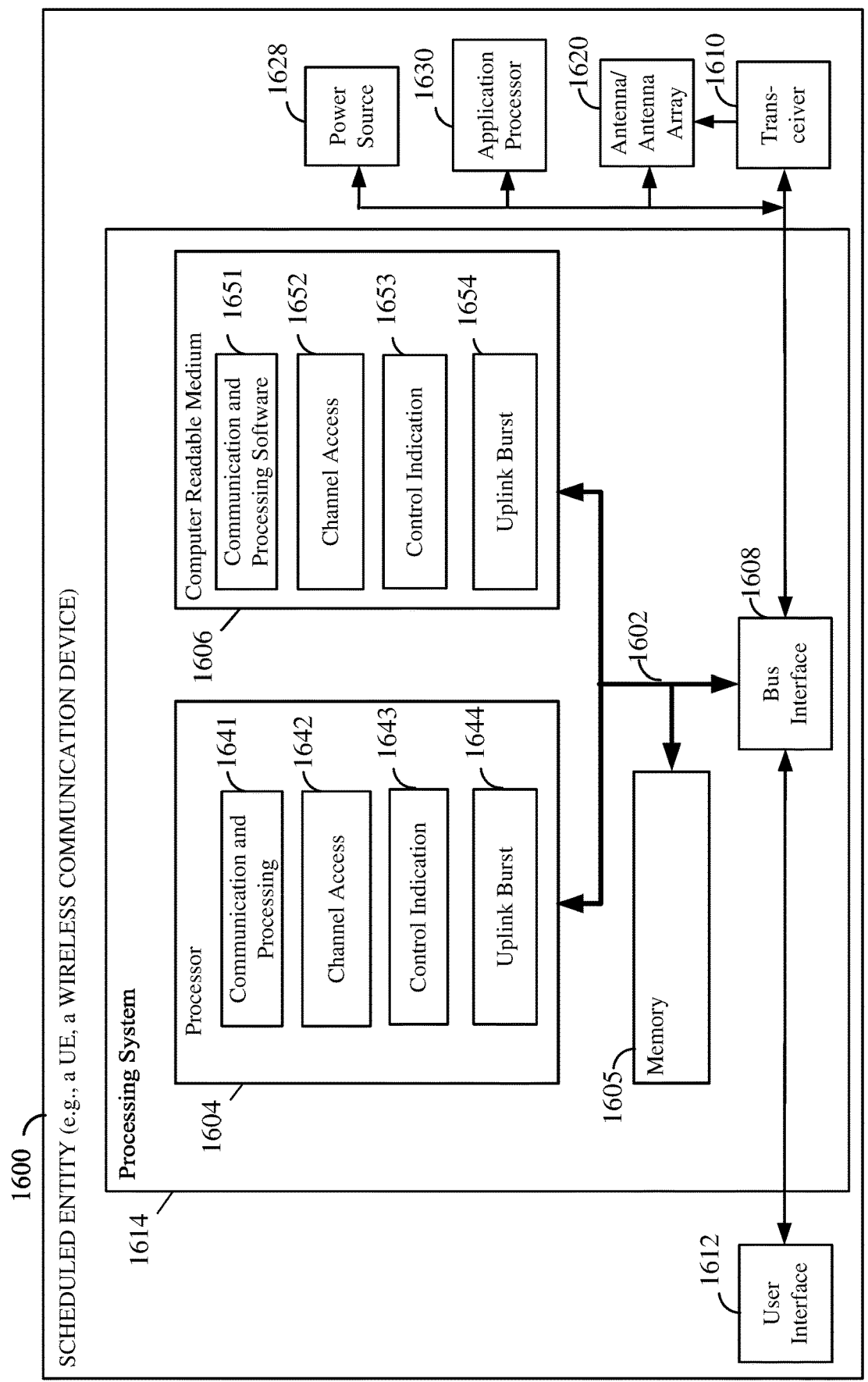
FIG. 16 is a block diagram illustrating an example of a hardware implementation for a scheduled entity according to some aspects of the disclosure.

FIG. 16 is a diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) or wireless communication device as illustrated in any one or more of FIGS. 1, 2, 7-11, and/or 19-22.

The processing system 1614 may be substantially the same as the processing system 1314 illustrated in FIG. 13, including a bus interface 1608, a bus 1602, memory 1605, a processor 1604, and a computer-readable medium 1606. Furthermore, the scheduled entity 1600 may include a user interface 1612, a transceiver 1610, an antenna array 1620, an application processor 1630, and a power source 1628 substantially similar to those described above in FIG. 13. That is, the processor 1604, as utilized in a scheduled entity 1600, may be used to implement any one or more of the processes described herein and illustrated in FIGS. 17, 18, 21 and 22.

In some aspects of the disclosure, the processor 1604 may include circuitry configured for various functions, including, for example, signaling and controlling channel access procedure in wireless communication using unlicensed spectrum.

In some aspects of the disclosure, the processor 1604 may include communication and processing circuitry 1641 configured for various functions, including for example communicating with a scheduling entity (e.g., a network access node, a base station), a network core (e.g., a 5G core network), other scheduled entities, or any other entity, such as, for example, local infrastructure or an entity communicating with the scheduled entity via the Internet, such as a network provider. In some examples, the communication and processing circuitry 1641 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1641 may be configured to transmit and process uplink traffic and uplink control messages (e.g., similar to uplink traffic 116 and uplink control 118 of FIG. 1) and receive and process downlink traffic and downlink control messages (e.g., similar to downlink traffic 112 and downlink control 114) via the antennas/antenna array 1620 and the transceiver 1610. The communication and processing circuitry 1641 may further be configured to execute communication and processing software 1651 stored on the computer-readable medium 1606 to implement one or more functions described herein.

In some aspects of the disclosure, the processor 1604 may include channel access circuitry 1642 configured for various functions, including, for example, performing a first channel access procedure to initiate a first channel occupancy time (COT) on a communication channel According to some aspects, a COT initiated by a wireless communication device (e.g., UE) via type 1 may be shared with a network access node (e.g., a gNB or scheduling entity). According to other aspects, the scheduled entity can initiate the first COT using any one of a type 1 or type 2A/2B/2C channel access procedure. In some examples, the channel access circuitry 1642 may include one or more hardware components that provide the physical structure that performs processes related to performing a first channel access procedure to initiate the first COT on the communication channel. The channel access circuitry 1642 may further be configured to execute channel access software 1652 stored on the computer-readable medium 1606 to implement one or more functions described herein.

In some aspects of the disclosure, the processor 1604 may include control indication circuitry 1643 configured for various functions, including, for example, adding a control indication to a message configured to be received and processed by a network access node, where the message may request the network access node (e.g., scheduling entity) to perform a second channel access procedure in a next downlink (DL) transmission burst. In one aspect, the scheduling entity can process the message at a physical layer (PHY). In some examples, the control indication circuitry 1643 may include one or more hardware components that provide the physical structure that performs processes related to adding the control indication to the message that is configured to be processed at, for example the PHY, of the network access node, where the message may instruct the network access node to perform the second channel access procedure of a second type (e.g., type 1 or type 2) in the next DL transmission burst. The control indication circuitry 1643 may further be configured to execute control indication software 1653 stored on the computer-readable medium 1606 to implement one or more functions described herein.

In some aspects of the disclosure, the processor 1604 may include uplink transmission burst circuitry 1644 configured for various functions, including, for example, transmitting a message to the network access node in an uplink (UL) transmission burst during the first COT on the communication channel. In some examples, the uplink transmission burst circuitry 1644 may include one or more hardware components that provide the physical structure that performs processes related to transmitting the message to the network access node in the UL transmission burst during the first COT on the communication channel. The uplink transmission burst circuitry 1644 may further be configured to execute uplink transmission burst software 1654 stored on the computer-readable medium 1606 to implement one or more functions described herein.

Figure 17:
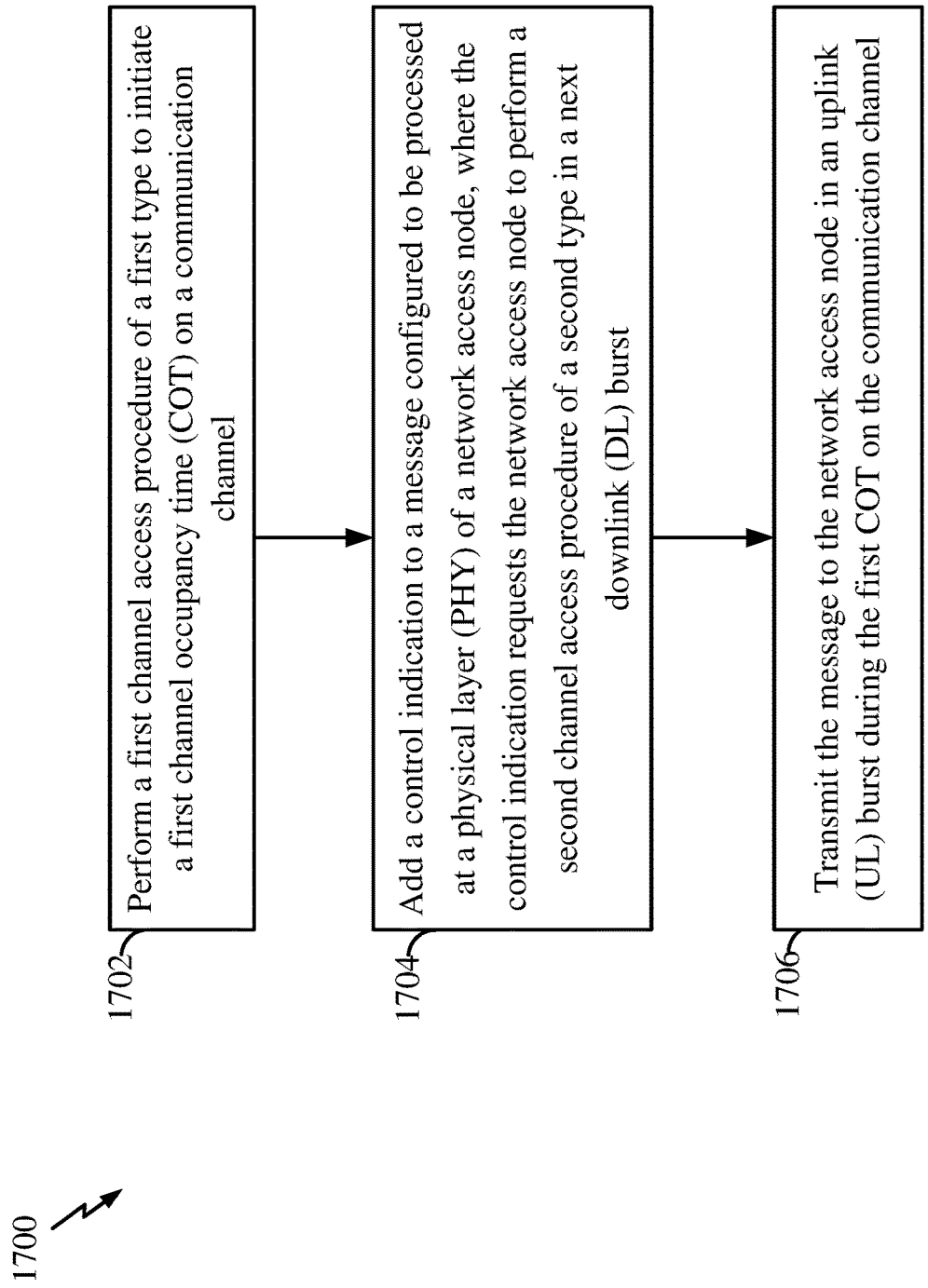
FIG. 17 is a flow chart illustrating an exemplary process at a wireless communication device for supporting signaling of a requested channel access type in wireless communication according to some aspects of the present disclosure.

FIG. 17 is a flow chart illustrating an exemplary process 1700 at a wireless communication device for supporting signaling of a requested channel access type in unlicensed spectrum (e.g., NR-U) in accordance with some aspects of the present disclosure. The wireless communication may be performed in an unlicensed spectrum; however, the exemplary process 1700 may also be applicable to communication in a licensed spectrum (e.g., 5G NR). As described below, some or all illustrated features may be omitted in a particular implementation within the scope of the present disclosure, and some illustrated features may not be required for the implementation of all examples. In some examples, the process 1700 may be carried out by the wireless communication device 1600 (e.g., scheduled entity or UE) illustrated in FIG. 16 in a communication network. In some examples, the process 1700 may be carried out by any suitable apparatus (e.g., UE) or means for carrying out the functions or algorithm described below.

At block 1702, the wireless communication device (e.g., a scheduled entity or UE) may perform a first channel access procedure of a first type to initiate a first channel occupancy time (COT) on a communication channel. In one aspect, the channel access circuitry 1642 can provide a means for performing the first channel access procedure. According to some aspects, a COT initiated by a wireless communication device via type 1 may be shared with a network access node (e.g., a gNB or scheduling entity). According to other aspects, the first type may be any one of a type 1 or type 2A/2B/2C channel access procedure.

At block 1704, the wireless communication device may add or include a control indication to a message that will be processed at a physical layer (PHY) of a network access node, where the control indication requests the network access node to perform a second channel access procedure of a second type in a next downlink (DL) transmission burst. The second type may be the same as the first type or may be different from the first type. For example, when the first type is a type 1, the second type may be a type 1 or a type 2 channel access procedure. In one aspect, the channel access circuitry 1642 can provide a means for adding the control indication to the message. As used herein, the word "request" may mean, for example, to indicate (e.g., to indicate a suggestion or to indicate a determination), or to determine and convey, or to make known, or to request the thing being indicated, for example, in a message. The request may be considered as a command according to some aspects. According to other aspects, the request may be optional. In one example, the receiving entity (e.g., a scheduling entity or gNB) may determine to comply with the request or deny (or ignore) the request. In other words, the receiving entity may make a final decision as to whether it will satisfy or not satisfy the request.

At block 1706, the wireless communication device may transmit the message to the network access node in an uplink (UL) transmission burst during the first COT on the communication channel. In one aspect, the communication and processing circuitry 1641 can provide a means for transmitting the message (e.g., message 1109 of FIG. 11) via the transceiver 1610 and antenna 1620.

According to some aspects, the message may be, for example, at least one of: a first uplink control information (UCI) message carried on a physical uplink control channel (PUCCH), a second UCI message carried on a physical uplink shared channel (PUSCH), an uplink MAC CE, or an uplink reference signal (RS). According to other aspects, the message may be transported to the network access node in the user plane or the control plane. The message may be as short as one bit; however, any length of message is within the scope of the disclosure. According to some aspects, the message may be a novel message and may be conveyed in a message, indication, or signaling other than that described herein.

According to some aspects, the wireless communication device (e.g., UE) may further generate the control indication to request that the second type is at least one of a type 1 or a type 2 (e.g., a type 2A, 2B, or 2C) channel access procedure to extend the first COT. In other aspects, the wireless communication device may request the second type as a function of a downlink (DL) traffic type. According to some examples, the DL traffic type may be at least one of: ultra-reliable low-latency communication (URLLC), enhanced mobile broadband (eMBB), machine type communication (MTC), or best-effort.

According to some aspects, the wireless communication device may further request the second type as a function of at least one of: a channel access priority class (CAPC) or a Quality of Service (QoS) of the next DL transmission burst. In still other examples, the wireless communication device may further request the second type as a function of a channel type used to convey the next DL transmission burst. The channel type may be, for example, at least one of: a physical downlink control channel (PDCCH), a physical downlink shared channel (PDSCH), a channel state information reference signal (CSI-RS), or a synchronization signal block (SSB). Other channel types are within the scope of the disclosure.

In some examples, the wireless communication device may further request the second type as a function of a transmission configuration indicator (TCI) state. In still other examples, the wireless communication device may further request the second type as a function of a resource type. Resource types may include at least one of: a downlink resource type, an uplink resource type, a flexible resource type, a full duplex resource type, a hard resource type, or a soft resource type.

According to some aspects, the control indication in the message may be a one-time indication, an indication that remains valid until it is updated, or an indication that remains valid for a specified amount of time.

According to other aspects, the wireless communication device may generate the control indication to indicate a starting time for channel access.

Figure 18:
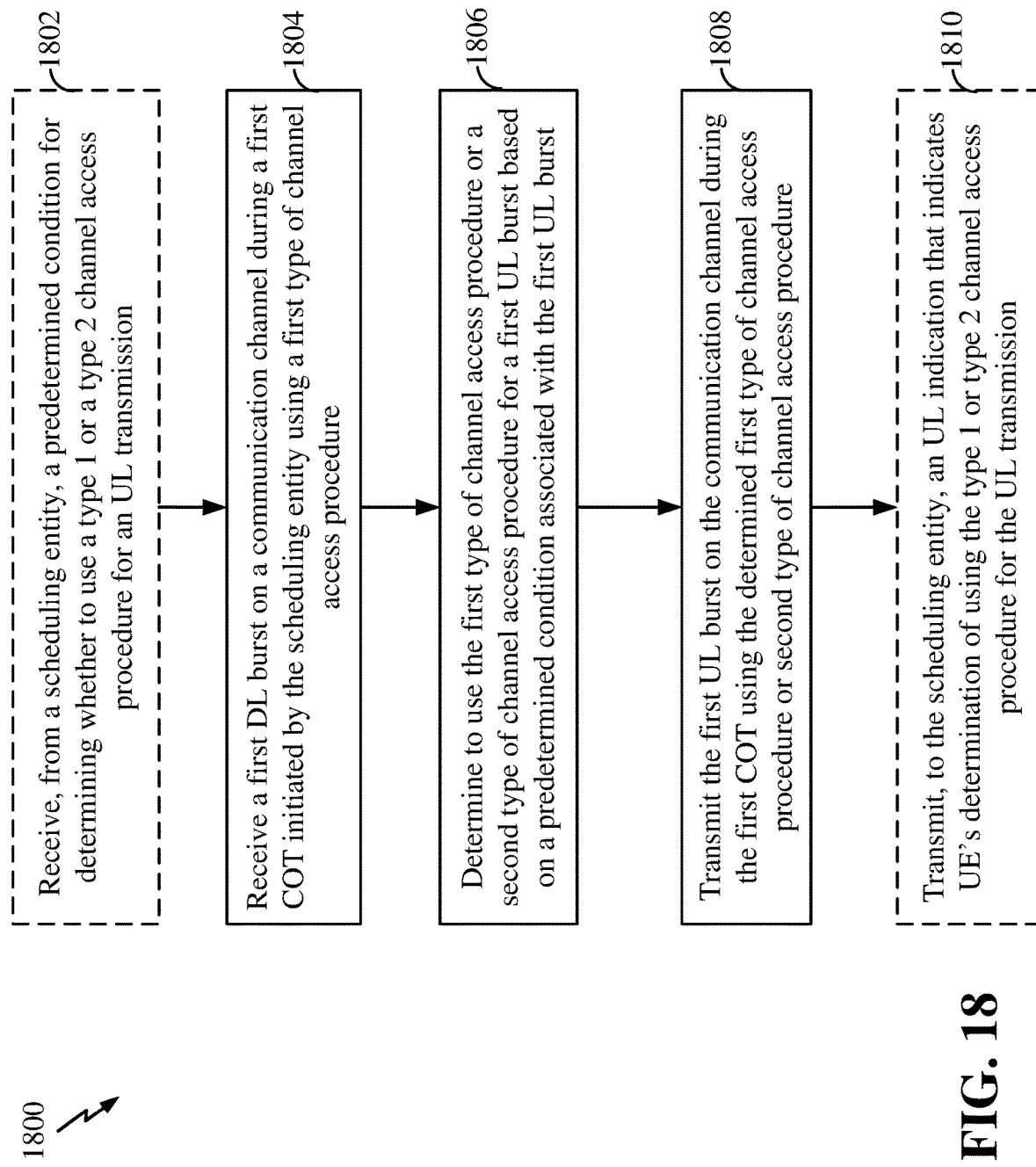
FIG. 18 is a flow chart illustrating an exemplary process for wireless communication at a wireless communication device using an unlicensed spectrum according to some aspects of the present disclosure.

FIG. 18 is a flow chart illustrating an exemplary process 1800 for wireless communication using an unlicensed spectrum (e.g., NR-U) in accordance with some aspects of the present disclosure. As described below, some or all illustrated features may be omitted in a particular implementation within the scope of the present disclosure, and some illustrated features may not be required for the implementation of all examples. In some examples, the process 1800 may be carried out by a wireless communication device (e.g., scheduled entity 1600) illustrated in FIG. 16. In some examples, the process 1800 may be carried out by any suitable apparatus or means for carrying out the functions or algorithm described below.

At block 1802, a UE (a scheduled entity) may receive a predetermined condition for an UL transmission burst (e.g., UL transmission burst) from a scheduling entity. In one aspect, the communication and processing circuitry 1641 (see FIG. 16) can provide a means for receiving the predetermined condition in DL control signaling, for example, in a DL RRC message, a DL MAC CE, a dynamic DCI with DL/UL grant (e.g., UL grant 907), an UL grant in a RACH response, and/or a PDCCH order. The UE may determine whether to use a type 1 or type 2 channel access procedure for an UL transmission burst (e.g., UL transmission burst 906) based on the predetermined condition. In some aspects, the predetermined condition may be known to the UE and defined in a communication standard (e.g., 5G NR), and the UE may not receive the predetermined condition from the scheduling entity. In some aspects, the predetermined condition may include one or more parameters: CAPC or QoS traffic type of the UL transmission, channel types, TCI states, resource pattern, and UL buffer status. The UE can determine whether to use type 1 or type 2 channel access procedure based on these parameters.

At block 1804, the UE may receive a first DL transmission burst from the scheduling entity on a communication channel during a first COT initiated by the scheduling entity using a first type (e.g., type 1) of channel access procedure. In one aspect, the communication and processing circuitry 1641 can provide a means for receiving the first DL transmission burst (e.g., $1^{st}$ DL 902 in FIG. 9) via the transceiver 1610 via the antenna 1620. The first COT (e.g., COT 904) may be initiated by the scheduling entity using a type 1 channel access procedure.

At block 1806, the UE may determine to use the first type (e.g., type 1) of channel access procedure or a second type (e.g., type 2) channel access procedure, to transmit a first UL transmission burst based on a predetermined condition associated with the UL transmission burst. In one aspect, the channel access circuitry 1642 can provide a means for determining whether to use the type 1 or type 2 channel access procedure to transmit the first UL transmission burst. The type 2 channel access procedure may be any of the type 2A, 2B, or 2C channel access procedure described above in relation to FIGS. 6A and 6B.

In one aspect, the UE may determine to use the first type or second type channel access procedure based on the predetermined condition received from the scheduling entity. For example, if the UE determines that the UL transmission burst can satisfy the predetermined condition, the UE uses the second type channel access procedure to transmit the UL transmission burst; otherwise, the UE uses the first type channel access procedure.

At block 1808, the UE may transmit the UL transmission burst to the scheduling entity on the communication channel during the first COT using the determined first type or second type channel access procedure. In one aspect, the communication and processing circuitry 1641 can provide a means for transmitting the UL transmission burst. If the scheduling entity previously transmitted the predetermined condition to the UE, the scheduling entity can determine whether the UL transmission burst satisfies the predetermined condition or not. In that case, the scheduling entity can determine if the UE used the type 1 or type 2 channel access procedure to access the communication channel in order to transmit the UL transmission burst.

At block 1810, the UE may transmit an UL indication or control message to indicate that the UE determined to perform the type 1 channel access procedure or the type 2 channel access procedure (e.g., type 2A/2B/2C channel access procedure) for the UL transmission burst. In one aspect, the communication and processing circuitry 1641 can provide a means for transmitting the UL control message.

In some aspects, the UE may transmit the UL control message (indication) using uplink control information (UCI), an uplink reference signal (e.g., SRS), an UL control message in a PUCCH or PUSCH, a medium access control (MAC) control element (CE), communication resources associated with the UL transmission burst, or any combination of the above. In one aspect, the UL control message may be configured to be valid for a single UL transmission burst, valid until updated by another UL control message, or valid for a predetermined duration. In one aspect, the UE may always transmit the UL control message or only when the UE determined to perform the second channel access procedure (i.e., switched from type 1 to type 2) for the UL transmission burst.

In addition to the application in the unlicensed spectrum (e.g., NR-U) for communication network channel access, the apparatuses, processes, messages, and/or signaling described herein can also be used in integrated access and backhaul (IAB) network applications, for channel occupancy time (COT) sharing between parent and child nodes (and multiples thereof).

Figure 19:
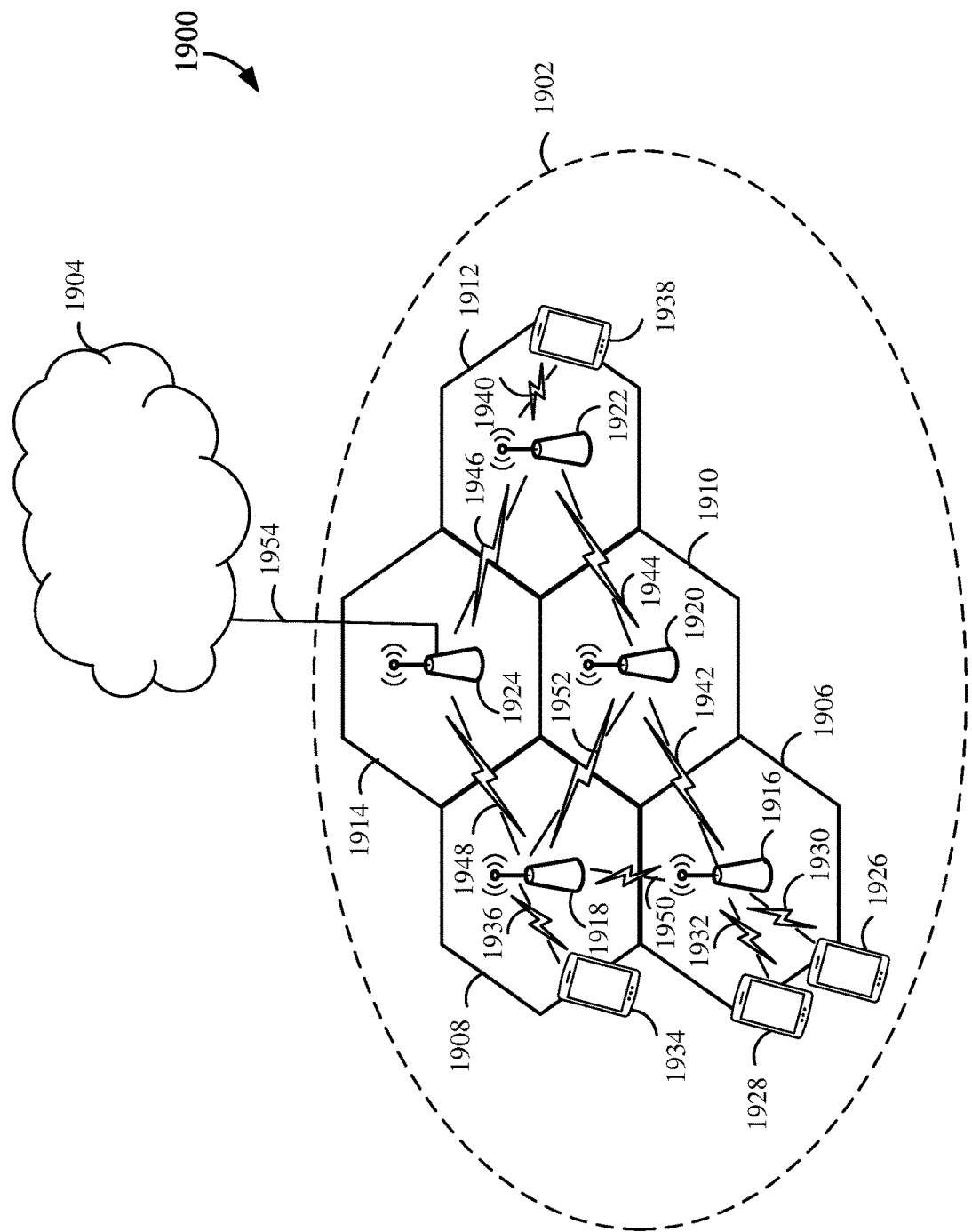
FIG. 19 is a diagram providing a high-level illustration of an exemplary integrated access backhaul (IAB) network according to some aspects.

FIG. 19 is a schematic diagram providing a high-level illustration of one example of an integrated access backhaul (IAB) network configuration 1900 that may be utilized in some aspects of the disclosure. In this illustration, a communication network 1902, such as an IAB network, is coupled to a remote network 1904, such as a main backhaul network or mobile core network. In such an IAB network 1902, the wireless spectrum may be used for both access links and backhaul links. In some examples, the wireless spectrum may utilize millimeter-wave (mmWave) or sub-6 GHz carrier frequencies.

The IAB network 1902 may be similar to the radio access network 200 shown in FIG. 2, in that the IAB network 1902 may be divided into a number of cells 1906, 1908, 1910, 1912, and 1914, each of which may be served by a respective IAB node 1916, 1918, 1920, 1922, and 1924. Each of the IAB nodes 1916-1924 may be an access point, network access node, base station (BS), eNB, gNB, or other node that utilizes wireless spectrum (e.g., the radio frequency (RF) spectrum) to support access for one or more scheduled entities (e.g., UEs) located within the cells 1906-1914 served by the IAB nodes.

In the example shown in FIG. 19, IAB node 1916 communicates with UEs 1926 and 1928 via wireless access links 1930 and 1932, IAB node 1918 communicates with UE 1934 via wireless access link 1936, and IAB node 1922 communicates with UE 1938 via wireless access link 1940. The IAB nodes 1916-1924 are further interconnected via one or more wireless backhaul links 1942, 1944, 1946, 1948, 1950, and 1952. Each of the wireless backhaul links 1942-1952 may utilize the same wireless spectrum (e.g., the radio frequency (RF) spectrum) as the access links 1930-1940 to backhaul access traffic to/from the remote network 1904. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 1902.

In the example shown in FIG. 19, IAB node 1916 communicates with IAB node 1920 via wireless backhaul link 1942, IAB node 1920 communicates with IAB node 1922 via wireless backhaul link 1944, IAB node 1922 communicates with IAB node 1924 via wireless backhaul link 1946, IAB node 1924 communicates with IAB node 1918 via wireless backhaul link 1948, IAB node 1918 communicates with IAB node 1916 via wireless backhaul link 1950, and IAB node 1918 communicates with IAB node 1920 via wireless backhaul link 1952. As shown in FIG. 19, each IAB node 1916-1924 may be connected via respective wireless backhaul links 1942-1952 to two or more other IAB nodes for robustness.

Some or all of the IAB nodes 1916-1924 may also be connected via wired backhaul links (e.g., fiber, coaxial cable, Ethernet, copper wires, etc.) and/or microwave backhaul links. Thus, the IAB network 1902 may support both wired/microwave and wireless backhaul traffic. At least one of the IAB nodes (e.g., IAB node 1924) may be a border IAB node, also referred to herein as an IAB donor node, that also provides a communication link 1954 to the remote network 1904. For example, the IAB donor node 1924 may include a wired (e.g., fiber, coaxial cable, Ethernet, copper wires), microwave, or other suitable link 1954 to the remote network 1904.

To facilitate wireless communication between the IAB nodes 1916-1924 and between the IAB nodes 1916-1924 and the UEs served by the IAB nodes 1916-1924, each IAB node 1916-1924 may be configured to operate as both a scheduling entity and a scheduled entity. Thus, an IAB node (e.g., IAB node 1916) may utilize the same wireless spectrum to transmit access traffic to/from UEs and to then backhaul that access traffic to/from the remote network 1904. For example, to backhaul access traffic to/from IAB node 1918, IAB node 1918 may communicate with IAB node 1920 to transmit backhaul access traffic via wireless backhaul link 1942, IAB node 1920 may communicate with IAB node 1922 to transmit the backhaul access traffic via wireless backhaul link 1944, and IAB node 1922 may communicate with IAB node 1924 to transmit the backhaul access traffic via wireless backhaul link 1946. In this example, IAB nodes 1920 and 1922 may each operate as both a scheduling entity and a scheduled entity to backhaul access traffic to/from IAB node 1916. As such, communication between a pair of IAB nodes may be individually scheduled by one of the IAB nodes within the pair.

In other examples, an IAB node may schedule wireless backhaul communications between other pairs of IAB nodes. For example, IAB node 1924 may operate as the scheduling entity for the IAB network 1902, while IAB nodes 1916, 1920, and 1922 each operate as a scheduled entity to backhaul access traffic to/from IAB node 1916. In this example, IAB node 1924 may schedule wireless backhaul communications between each of the pairs of IAB nodes (e.g., between IAB node 1916 and IAB node 1920, between IAB node 1920 and IAB node 1922, and between IAB node 1922 and IAB node 1924). As another example, IAB node 1922 may operate as a scheduling entity to schedule wireless backhaul communications between IAB nodes 1916 and 1920 and also between IAB node 1920 and IAB node 1922. IAB node 1922 may then operate as a scheduled entity to allow IAB node 1924 to schedule wireless backhaul communications therebetween.

Figure 20:
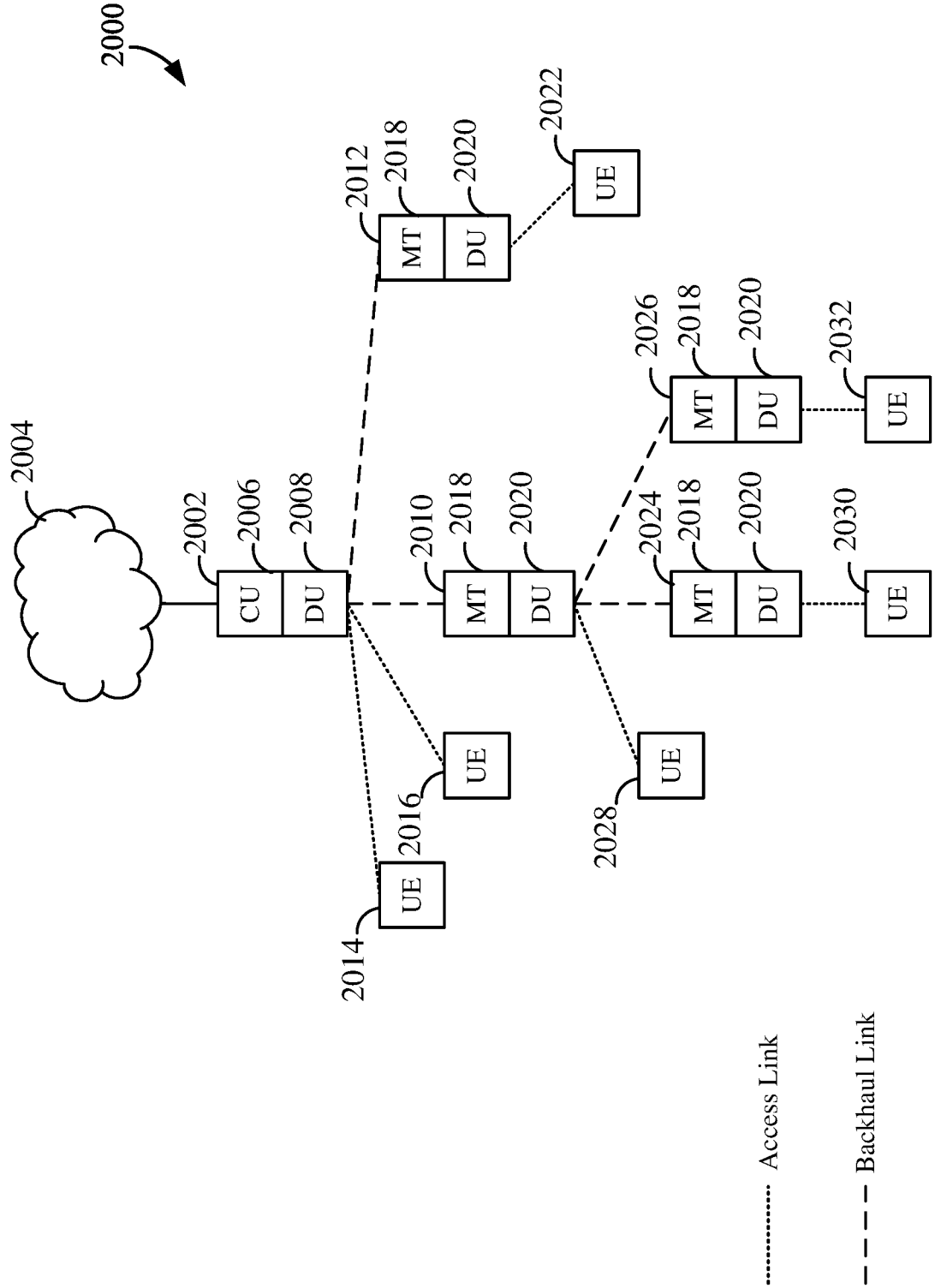
FIG. 20 is a diagram illustrating an example of IAB node functionality within an IAB network according to some aspects.

FIG. 20 is a schematic diagram illustrating an example of IAB node functionality within an IAB network 2000. In the example shown in FIG. 20, an IAB node 2002 is shown coupled to a core network 2004 via a wireline connection. This IAB node 2002 may be referred to herein as an IAB donor node, which may be, for example, an enhanced gNB including functionality for controlling the IAB network 2000. In some examples, the IAB donor node 2002 may include a central unit (CU) 2006 and a distributed unit (DU) 2008. The CU 2006 is configured to operate as a centralized network node (or central entity) within the IAB network 2000. For example, the CU 2006 may include radio resource control (RRC) layer functionality and packet data convergence protocol (PDCP) layer functionality to control/configure the other nodes (e.g., IAB nodes and UEs) within the IAB network 2000.

The DU 2008 is configured to operate as a scheduling entity to schedule scheduled entities (e.g., other IAB nodes and UEs) of the IAB donor node 2002. For example, the DU 2008 of the IAB donor node 2002 may operate as a scheduling entity to schedule IAB nodes 2010 and 2012 and UEs 2014 and 2016. Thus, the DU 2008 of the IAB donor node 2002 may schedule communication with IAB nodes 2010 and 2012 via respective backhaul links and schedule communication with UEs 2014 and 2016 via respective access links. In some examples, the DU 2008 may include the radio link control (RLC), medium access control (MAC), and physical (PHY) layer functionality to enable operation as a scheduling entity.

Each of the IAB nodes 2010 and 2012 may be configured as a Layer 2 (L2) relay node including a respective DU 2020 and a mobile termination (MT) unit 2018 to enable each L2 relay IAB node 2010 and 2012 to operate as a scheduling entity and a scheduled entity. For example, the MT unit 2018 within each of the L2 relay IAB nodes 2010 and 2012 is configured to operate as a scheduled entity that may be scheduled by the IAB donor node 2002. Each MT unit 2018 within the L2 relay IAB nodes 2010 and 2012 further facilitates communication with the IAB donor node 2002 via respective backhaul links. In addition, the DU 2020 within each of the L2 relay IAB nodes 2010 and 2012 operates similar to the DU 2008 within the IAB donor node 2002 to function as a scheduling entity to schedule one or more respective scheduled entities (e.g., other IAB nodes and/or UEs) of the L2 relay IAB nodes 2010 and 2012.

For example, the DU 2020 of L2 relay IAB node 2012 functions as a scheduling entity to schedule communication with a UE 2022 via an access link, while the DU 2020 of L2 relay IAB node 2010 functions as a scheduling entity to schedule communication with the MT units 2018 of L2 relay IAB nodes 2024 and 2026 via respective backhaul links and a UE 2028 via an access link. Each of the L2 relay IAB nodes 2024 and 2026 further includes a respective DU 2020 that functions as a scheduling entity to communicate with respective UEs 2030 and 2032. Thus, in the network topology illustrated in FIG. 20, since IAB donor node 2002 is configured to control each of the other nodes in the IAB network, the IAB donor node 2002 is a parent IAB node of child IAB nodes 2010, 2012, 2024 and 2026. In addition, IAB node 2010 is further a parent IAB node of child IAB nodes 2024 and 2026. For example, the CU 2006 and DU 2008 within IAB donor node 2002 may function as the parent IAB node of child IAB nodes 2010, 2012, 2024, and 2026, and the DU 2020 within IAB node 2010 may function as the parent IAB node of child IAB nodes 2024 and 2026. The MT unit 2018 within IAB nodes 2010, 2012, 2024, and 2026 may further function as child IAB nodes.

Figure 21:
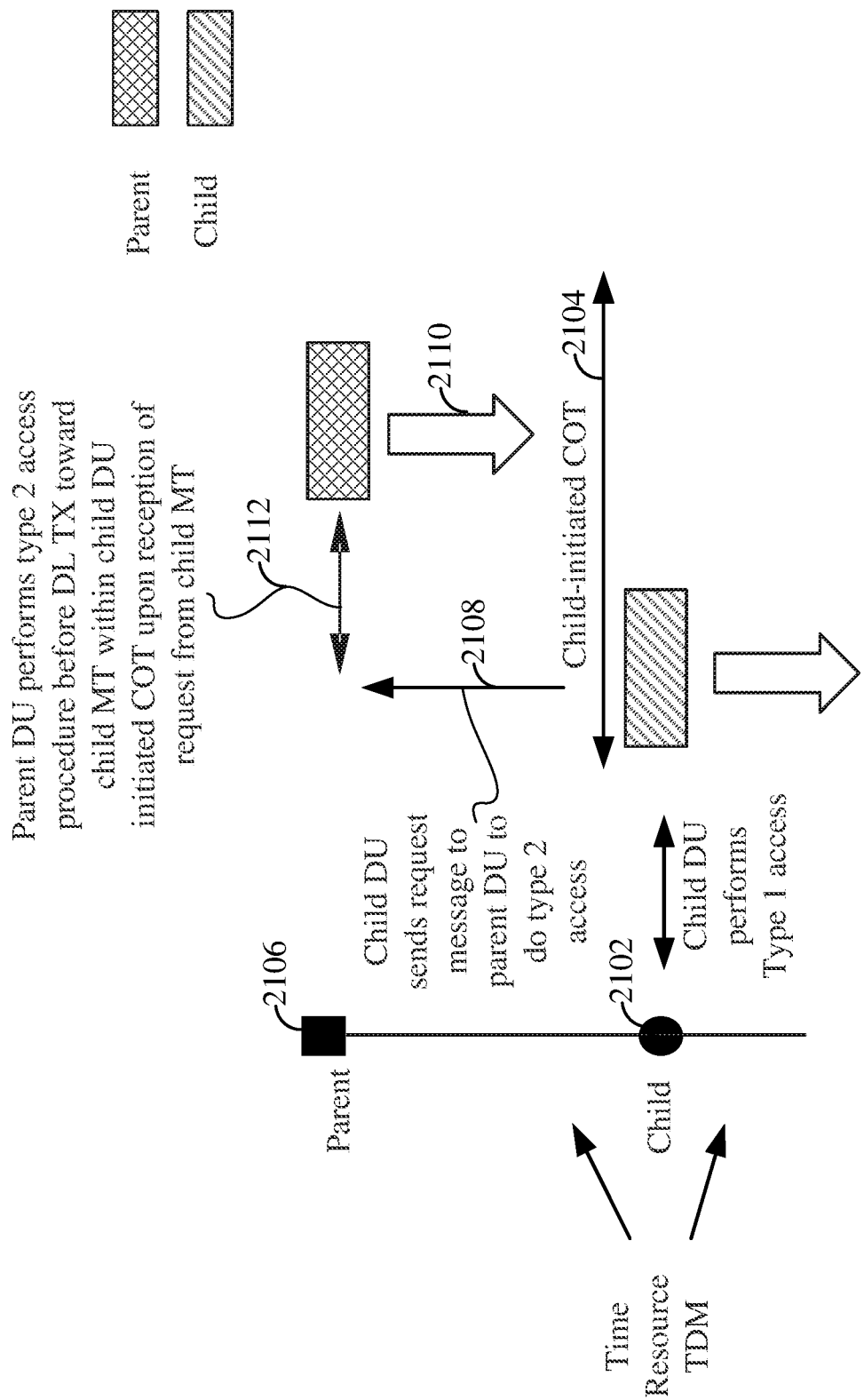
FIG. 21 is a schematic illustration of a COT initiated by a child distributed unit (DU) in an integrated access and backhaul (IAB) network according to some aspects of the disclosure.

FIG. 21 is a schematic illustration of a channel occupancy time (COT) initiated by a child distributed unit (DU) in an IAB network according to some aspects of the disclosure. In the example of FIG. 21, the child DU 2102 initiates the COT 2104 and shares the COT with a parent DU 2106 via a request message (e.g., a control indication 2108) sent by the child mobile termination (MT). In the example, the child DU requests the parent DU to perform a type 2 channel access procedure (e.g., type 2A, 2B, or 2C channel access procedure). The parent DU can perform the type 2 channel access procedure before a downlink transmission 2110 (DL TX) toward the child MT, within the child DU initiated COT. The parent DU can perform the type 2 channel access procedure 2112 upon reception of the message from the child MT.

Figure 22:
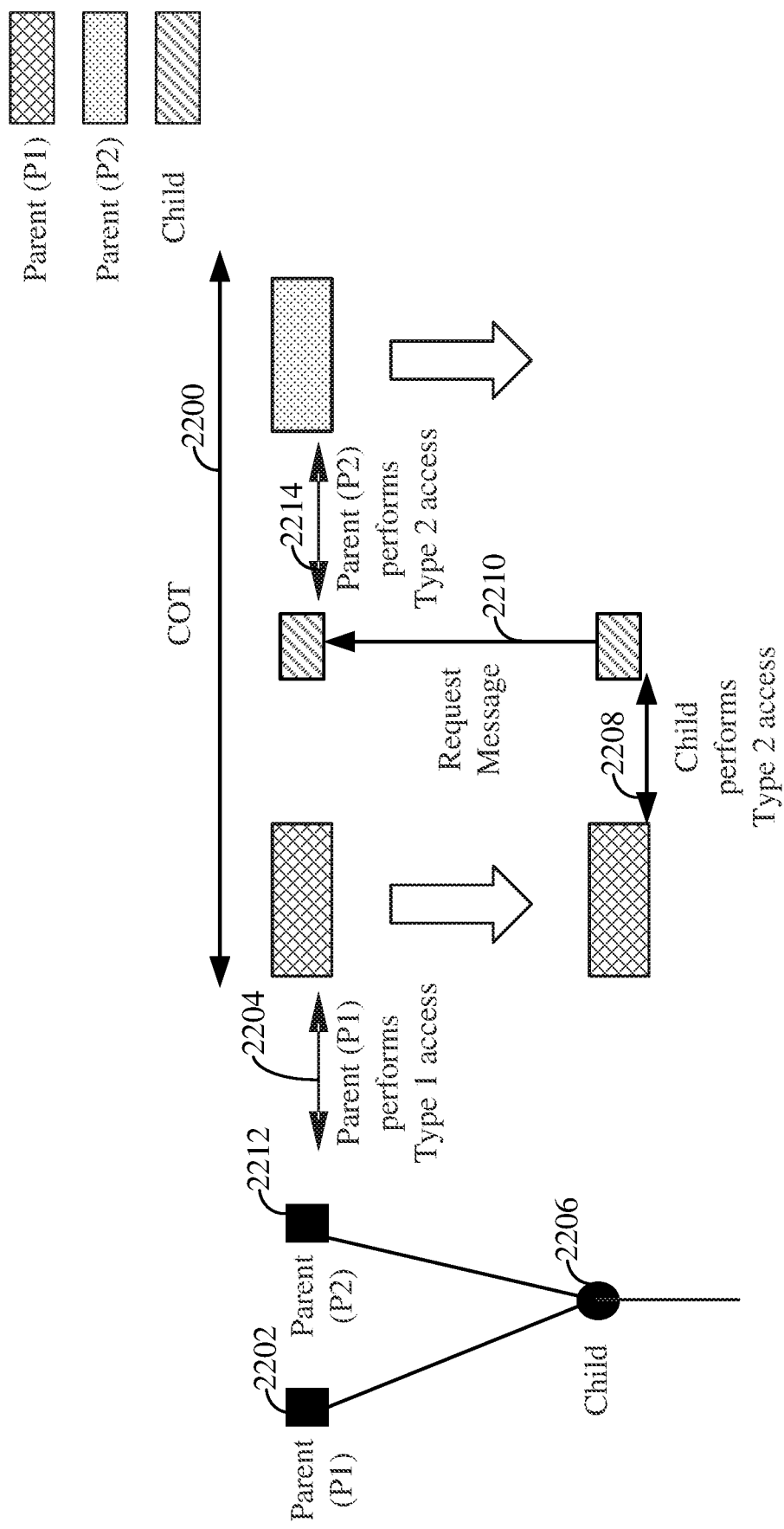
FIG. 22 is a schematic illustration of COT sharing between multiple parent nodes and a child mobile termination (MT) in an IAB network according to some aspects of the disclosure.

FIG. 22 is a schematic illustration of channel occupancy time (COT) 2200 sharing between multiple parent nodes and a child mobile termination (MT), via a request message sent from the child MT, in an integrated access and backhaul (IAB) network according to some aspects of the disclosure. In the example of FIG. 22, the first parent node (P1) 2202 performs a type 1 channel access procedure 2204 and shares the COT with the child MT 2206. The child MT can perform a type 2 channel access procedure 2208 and send a request message 2210 (e.g., a control indication) indicating that the second parent node (P2) 2212 is to perform a type 2 channel access procedure 2214 to share the COT with the first parent node (P1) and the child MT. The second parent node performs the type 2 channel access procedure 2214 upon reception of the message from the child MT.

Several aspects of a wireless communication network have been presented with reference to an exemplary implementation. As those skilled in the art will readily appreciate, various aspects described throughout this disclosure may be extended to other telecommunication systems, network architectures and communication standards.

In a first aspect, a method of wireless communication at a scheduling entity is disclosed. The method comprises: performing a first channel access procedure to initiate a first channel occupancy time (COT) on a communication channel; transmitting, to a scheduled entity, a first downlink (DL) transmission burst on the communication channel during the first COT; receiving, from the scheduled entity, an uplink (UL) transmission burst on the communication channel during the first COT; and determining a type of a second channel access procedure performed by the scheduled entity for the UL transmission burst.

In a second aspect, alone or in combination with the first aspect, the method further comprises: determining the type of the second channel access procedure based on a predetermined condition, wherein the predetermined condition comprises at least one of: a channel access priority class of the UL transmission burst; a quality of service of the UL transmission burst; a channel type of the UL transmission burst; a transmission configuration indicator (TCI) state of the UL transmission burst; a resource pattern associated with the UL transmission burst; or an UL buffer status of the scheduled entity.

In a third aspect, alone or in combination with the second aspect, the method further comprises, at least one of: transmitting, to the scheduled entity, a DL indication using at least one of: a radio resource control message; a medium access control (MAC) control element; downlink control information; a downlink grant; an uplink grant; or a physical downlink control channel (PDCCH) order, wherein the DL indication comprises the predetermined condition.

In a fourth aspect, alone or in combination with any of the first to third aspects, the method further comprises: receiving, from the scheduled entity, an uplink (UL) indication during the first COT; and determining the type of the second channel access procedure performed by the scheduled entity based on the UL indication.

In a fifth aspect, alone or in combination with the fourth aspect, the method further comprises: transmitting, to the scheduled entity, an UL grant indicating the type of the second channel access procedure for the UL transmission burst, wherein the UL indication indicates that the scheduled entity switched from a first type of channel access procedure indicated by the UL grant to a second type of channel access procedure for the UL transmission burst.

In a sixth aspect, alone or in combination with any of the fourth to fifth aspects, wherein the UL indication indicates that the type of the second channel access procedure is a type 1 channel access procedure or a type 2 channel access procedure, and wherein the type 2 channel access procedure comprises a type 2A, a type 2B, or a type 2C channel access procedure.

In a seventh aspect, alone or in combination with any of the fourth to sixth aspects, wherein the UL indication is configured to be valid for a single UL transmission burst, valid until updated by a next UL control message, or valid for a predetermined duration.

In an eighth aspect, alone or in combination with any of the first to seventh aspects, the method further comprises: receiving a message from the scheduled entity during a second COT initiated by the scheduled entity; and processing the message at a physical layer (PHY) of the scheduling entity, wherein the message comprises a control indication requesting the scheduling entity to perform a first type of channel access procedure for a second DL transmission burst after the first DL transmission burst.

In a ninth aspect, alone or in combination with any of the first to eighth aspects, wherein the first type is at least one of a type 1, a type 2A, a type 2B, or a type 2C channel access procedure.

In a tenth aspect, alone or in combination with the eighth aspect, wherein the message further comprises at least one condition, and the method further comprises at least one of: performing, upon receiving the message, the requested first type of channel access procedure in the second DL transmission burst if the at least one condition is met, or selectively performing, upon receiving the message, the requested first type of channel access procedure based on an implementation of the scheduling entity in the second DL transmission burst if the at least one condition is met.

In an eleventh aspect, a scheduling entity for wireless communication is disclosed. The scheduling entity comprises: a communication interface configured for wireless communication with a scheduled entity via a communication channel; a memory; and a processor operatively coupled to the communication interface and the memory. The processor and the memory are configured to: perform a first channel access procedure to initiate a first channel occupancy time (COT) on the communication channel; transmit, to the scheduled entity, a first downlink (DL) transmission burst on the communication channel during the first COT; receive, from the scheduled entity, an uplink (UL) transmission burst on the communication channel during the first COT; and determine a type of a second channel access procedure performed by the scheduled entity for the UL transmission burst.

In a twelfth aspect, alone or in combination with the eleventh aspect, wherein the processor and the memory are further configured to: determine the type of the second channel access procedure based on a predetermined condition, wherein the predetermined condition comprises at least one of: a channel access priority class of the UL transmission burst; a quality of service of the UL transmission burst; a channel type of the UL transmission burst; a transmission configuration indicator (TCI) state of the UL transmission burst; a resource pattern associated with the UL transmission burst; or an UL buffer status of the scheduled entity.

In a thirteenth aspect, alone or in combination with any of the eleventh to twelfth aspects, wherein the processor and the memory are further configured to: receive, from the scheduled entity, an uplink (UL) indication during the first COT; and determine the type of the second channel access procedure performed by the scheduled entity based on the UL indication.

In a fourteenth aspect, alone or in combination with any of the eleventh to thirteenth aspects, wherein the processor and the memory are further configured to: receive a message from the scheduled entity during a second COT initiated by the scheduled entity; and process the message at a physical layer (PHY) of the scheduling entity, wherein the message comprises a control indication requesting the scheduling entity to perform a first type of channel access procedure for a second DL transmission burst after the first DL transmission burst.

In a fifteenth aspect, a method of wireless communication at a scheduled entity is disclosed. The method comprises: receiving, from a scheduling entity, a first downlink (DL) transmission burst on a communication channel during a first channel occupancy time (COT) initiated by the scheduling entity using a first type of channel access procedure; determining to use the first type of channel access procedure or a second type of channel access procedure for a first uplink (UL) transmission burst based on a predetermined condition associated with the first UL transmission burst; and transmitting, to the scheduling entity, the first UL transmission burst on the communication channel during the first COT using the determined first type of channel access procedure or second type of channel access procedure.

In a sixteenth aspect, alone or in combination with the fifteenth aspect, the method further comprises: receiving, from the scheduling entity, a DL indication comprising the predetermined condition associated with the first UL transmission burst, wherein receiving the DL indication comprises at least one of: receiving the DL indication in a radio resource control message; receiving the DL indication in a medium access control (MAC) control element; receiving the DL indication in downlink control information; receiving the DL indication in a downlink grant; receiving the DL indication in an uplink grant; or receiving the DL indication in a physical downlink control channel (PDCCH) order.

In a seventeenth aspect, alone or in combination with any of the fifteen to sixteenth aspects, wherein the predetermined condition comprises at least one of: a channel access priority class of the first UL transmission burst; a quality of service of the first UL transmission burst; a channel type of the first UL transmission burst; a transmission configuration indicator (TCI) state of the first UL transmission burst; a resource pattern associated with the first UL transmission burst; or an UL buffer status of the scheduled entity.

In an eighteenth aspect, alone or in combination with any of the fifteen to seventeenth aspects, the method further comprises: transmitting, to the scheduling entity, an UL indication indicating that the scheduled entity performed the first type of channel access procedure or the second type of channel access procedure for the first UL transmission burst, based on the predetermined condition.

In a nineteenth aspect, alone or in combination with any of the fifteen to eighteenth aspects, wherein the second type of channel access procedure comprises a type 2A, a type 2B, or a type 2C channel access procedure.

In a twentieth aspect, alone or in combination with any of the eighteenth to nineteenth aspects, wherein the UL indication is configured to be valid for a single UL transmission burst, valid until updated by a next UL control message, or valid for a predetermined duration.

In a twenty-first aspect, alone or in combination with any of the eighteenth to twentieth aspects, wherein the transmitting the UL indication comprises: transmitting the UL indication only when the scheduled entity determined to switch from the first type of channel access procedure to the second type of channel access procedure for the UL first transmission burst, the first type of channel access procedure for the first UL transmission burst being previously indicated by the scheduling entity or defined according to a communication specification.

In a twenty-second aspect, alone or in combination with any of the fifteenth to twenty-first aspects, the method further comprises: performing the first type of channel access procedure to initiate a second COT on the communication channel; adding a control indication to a message configured to be processed at a physical layer (PHY) of the scheduling entity, wherein the control indication requests the scheduling entity to perform the second type of channel access procedure in a next DL transmission burst; and transmitting the message to the scheduling entity in a second UL transmission burst during the second COT on the communication channel.

In a twenty-third aspect, alone or in combination with the twenty-second aspect, wherein the message comprises at least one of: a first uplink control information (UCI) message carried on a physical uplink control channel (PUCCH); a second uplink control information (UCI) message carried on a physical uplink shared channel (PUSCH); an uplink medium access control (MAC) control element (MAC-CE); or an uplink reference signal (RS).

In a twenty-fourth aspect, alone or in combination with any of the twenty-second to twenty-third aspects, the method further comprises: requesting the second type of channel access procedure as a function of at least one of: a downlink (DL) traffic type; a channel access priority class (CAPC) of the next DL transmission burst; a Quality of Service (QoS) of the next DL transmission burst; a channel type used to convey the next DL transmission burst; a transmission configuration indicator (TCI) state of the DL transmission burst; or a resource type of the DL transmission burst.

In a twenty-fifth aspect, alone or in combination with any of the twenty-second to twenty-fourth aspects, wherein the control indication in the message comprises at least one of: a one-time indication, an indication that remains valid until it is updated, or an indication that remains valid for a specified amount of time.

In a twenty-sixth aspect, alone or in combination with any of the twenty-second to twenty-fifth aspects, the method further comprises: generating the control indication to indicate a starting time for channel access.

In a twenty-seventh aspect, a scheduled entity for wireless communication is disclosed. The scheduled entity comprises: a communication interface configured for wireless communication with a scheduling entity via a communication channel; a memory; and a processor operatively coupled to the communication interface and the memory, wherein the processor and the memory are configured to: receive, from the scheduling entity, a first downlink (DL) transmission burst on a communication channel during a first channel occupancy time (COT) initiated by the scheduling entity using a first type of channel access procedure; determine to use the first type of channel access procedure or a second type of channel access procedure for a first uplink (UL) transmission burst based on a predetermined condition associated with the UL transmission burst; and transmit, to the scheduling entity, the first UL transmission burst on the communication channel during the first COT using the determined first type of channel access procedure or second type of channel access procedure.

In a twenty-eighth aspect, alone or in combination with the twenty-seventh aspect, wherein the processor and the memory are further configured to: perform the first type of channel access procedure to initiate a second COT on the communication channel; add a control indication to a message configured to be processed at a physical layer (PHY) of the scheduling entity, wherein the control indication requests the scheduling entity to perform the second type of channel access procedure in a next DL transmission burst; and transmit the message to the scheduling entity in a second UL transmission burst during the second COT on the communication channel.

In a twenty-ninth aspect, alone or in combination with any of the twenty-seven to twenty-eighth aspects, wherein the predetermined condition comprises at least one of: a channel access priority class of the first UL transmission burst; a quality of service of the first UL transmission burst; a channel type of the first UL transmission burst; a transmission configuration indicator (TCI) state of the first UL transmission burst; a resource pattern associated with the first UL transmission burst; or an UL buffer status of the scheduled entity.

In a thirtieth aspect, alone or in combination with any of the twenty-seven to twenty-ninth aspects, wherein the processor and the memory are further configured to: transmit, to the scheduling entity, an UL indication indicating that the scheduled entity performed the first type of channel access procedure or the second type of channel access procedure for the first UL transmission burst, based on the predetermined condition.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduling entity for wireless communication, comprising:
   a communication interface configured for wireless communication with a user equipment (UE) via a communication channel;

a memory; and a processor operatively coupled to the communication interface and the memory, wherein the processor and the memory are configured to:

perform a first channel access procedure to initiate a first channel occupancy time (COT) on a communication channel;

transmit, to the UE a first downlink (DL) transmission burst on the communication channel during the first COT;

receive, from the UE, an uplink (UL) transmission burst on the communication channel during the first COT;

determine a type of a second channel access procedure performed by the UE for the UL transmission burst; and receive, from the UE, an uplink (UL) indication during the first COT, wherein the UL indication indicates that the UE has switched from a first type of channel access procedure to a second type of channel access procedure for the UL transmission burst and wherein the UL indication indicates that the second type of the channel access procedure is a type 1 channel access procedure or a type 2 channel access procedure.

2. The scheduling entity of claim 1, wherein the processor and the memory are further configured to:

determine the type of the second channel access procedure based on a predetermined condition, wherein the predetermined condition comprises at least one of:

a channel access priority class of the UL transmission burst;

a quality of service of the UL transmission burst;

a channel type of the UL transmission burst;

a transmission configuration indicator (TCI) state of the UL transmission burst;

a resource pattern associated with the UL transmission burst; or an UL buffer status of the UE.

3. The scheduling entity of claim 2, wherein the processor and the memory are further configured to:

transmit, to the UE, a DL indication using at least one of: a radio resource control message; a medium access control (MAC) control element; downlink control information; a downlink grant; an uplink grant; or a physical downlink control channel (PDCCH) order, wherein the DL indication comprises the predetermined condition.

4. The scheduling entity of claim 1, wherein the processor and the memory are further configured to:

determine the type of the second channel access procedure performed by the UE based on the UL indication.

5. The scheduling entity of claim 4, wherein the type 2 channel access procedure comprises a type 2A, a type 2B, or a type 2C channel access procedure.

6. The scheduling entity of claim 4, wherein the UL indication is configured to be valid for a single UL transmission burst, valid until updated by a next UL control message, or valid for a predetermined duration.

7. The scheduling entity of claim 1, wherein the processor and the memory are further configured to:

receive a message from the UE during a second COT initiated by the UE; and process the message at a physical layer (PHY) of the scheduling entity, wherein the message comprises a control indication requesting the scheduling entity to perform a first type of channel access procedure for a second DL transmission burst after the first DL transmission burst.

8. The scheduling entity of claim 7, wherein the first type of channel access procedure comprises at least one of a type 1, a type 2A, a type 2B, or a type 2C channel access procedure.

9. The scheduling entity of claim 7, wherein the message further comprises at least one condition, and the processor and the memory are further configured to, at least one of:

perform, upon receiving the message, the requested first type of channel access procedure in the second DL transmission burst if the at least one condition is met, or selectively perform, upon receiving the message, the requested first type of channel access procedure based on an implementation of the scheduling entity in the second DL transmission burst if the at least one condition is met.

10. A method of wireless communication at a user equipment (UE) for wireless communication, comprising:

receiving, from a scheduling entity, a first downlink (DL) transmission burst on a communication channel during a first channel occupancy time (COT) initiated by the scheduling entity using a first type of channel access procedure;

determining to use the first type of channel access procedure over a second type of channel access procedure for a first uplink (UL) transmission burst based on a predetermined condition associated with the first UL transmission burst;

transmitting an UL indication when the UE switched from the first type of channel access procedure to the second type of channel access procedure for the UL first transmission burst, wherein the first type of channel access procedure for the first UL transmission burst was previously indicated by the scheduling entity and wherein the UL indication indicates that second type of the channel access procedure is a type 1 channel access procedure or a type 2 channel access procedure; and transmitting, to the scheduling entity, the first UL transmission burst on the communication channel during the first COT using the second type of channel access procedure.

11. The method of claim 10, wherein the predetermined condition comprises at least one of:

a channel access priority class of the first UL transmission burst;

a quality of service of the first UL transmission burst;

a channel type of the first UL transmission burst;

a transmission configuration indicator (TCI) state of the first UL transmission burst;

a resource pattern associated with the first UL transmission burst; or an UL buffer status of the UE.

12. The method of claim 10, further comprising:

transmitting, to the scheduling entity, the uplink (UL) indication indicating that the UE performed the first type of channel access procedure or the second type of channel access procedure for the first UL transmission burst, based on the predetermined condition.

13. The method of claim 12, wherein the UL indication is configured to be valid for a single UL transmission burst, valid until updated by a next UL control message, or valid for a predetermined duration.

14. The method of claim 11, comprising:
performing the first type of channel access procedure to initiate a second COT on the communication channel;
adding a control indication to a message configured to be processed at a physical layer (PHY) of the scheduling entity, wherein the control indication requests the scheduling entity to perform the second type of channel access procedure in a next DL transmission burst; and
transmitting the message to the scheduling entity in a second UL transmission burst during the second COT on the communication channel.

15. The method of claim 14, further comprising:
requesting the second type of channel access procedure as a function of at least one of: a downlink (DL) traffic type; a channel access priority class (CAPC) of the next DL transmission burst; a Quality of Service (QOS) of the next DL transmission burst; a channel type used to convey the next DL transmission burst; a transmission configuration indicator (TCI) state of the DL transmission burst; or a resource type of the DL transmission burst.

16. The method of claim 14, wherein the control indication in the message comprises at least one of: a one-time indication, an indication that remains valid until it is updated, or an indication that remains valid for a specified amount of time.

17. A user equipment (UE) for wireless communication, comprising:
a communication interface configured for wireless communication with a scheduling entity via a communication channel;
a memory; and
a processor operatively coupled to the communication interface and the memory,
wherein the processor and the memory are configured to:
receive, from the scheduling entity, a first downlink (DL) transmission burst on a communication channel during a first channel occupancy time (COT) initiated by the scheduling entity using a first type of channel access procedure;
determine to use the first type of channel access procedure over a second type of channel access procedure for a first uplink (UL) transmission burst based on a predetermined condition associated with the UL transmission burst;
transmit an UL indication when the UE switched from the first type of channel access procedure to the second type of channel access procedure for the UL first transmission burst, wherein the first type of channel access procedure for the first UL transmission burst was previously indicated by the scheduling entity and wherein the UL indication indicates that second type of the channel access procedure is a type 1 channel access procedure or a type 2 channel access procedure; and
transmit, to the scheduling entity, the first UL transmission burst on the communication channel during the first COT using the second type of channel access procedure.

18. The UE of claim 17, wherein the processor and the memory are further configured to receive, from the scheduling entity, a DL indication in at least one of:
a radio resource control message;
a medium access control (MAC) control element;
downlink control information;
a downlink grant;
an uplink grant; or
a physical downlink control channel (PDCCH) order,
wherein the DL indication comprises the predetermined condition associated with the first UL transmission burst.

19. The UE of claim 17, wherein the predetermined condition comprises at least one of:
a channel access priority class of the first UL transmission burst;
a quality of service of the first UL transmission burst;
a channel type of the first UL transmission burst;
a transmission configuration indicator (TCI) state of the first UL transmission burst;
a resource pattern associated with the first UL transmission burst; or
an UL buffer status of the UE.

20. The UE of claim 17, wherein the processor and the memory are further configured to:
transmit, to the scheduling entity, the uplink (UL) indication indicating that the UE performed the first type of channel access procedure or the second type of channel access procedure for the first UL transmission burst, based on the predetermined condition.

21. The UE of claim 20, wherein the second type of channel access procedure comprises a type 2A, a type 2B, or a type 2C channel access procedure.

22. The UE of claim 20, wherein the UL indication is configured to be valid for a single UL transmission burst, valid until updated by a next UL control message, or valid for a predetermined duration.

23. The UE of claim 17, wherein the processor and the memory are further configured to:
perform the first type of channel access procedure to initiate a second COT on the communication channel;
add a control indication to a message configured to be processed at a physical layer (PHY) of the scheduling entity, wherein the control indication requests the scheduling entity to perform the second type of channel access procedure in a next DL transmission burst; and
transmit the message to the scheduling entity in a second UL transmission burst during the second COT on the communication channel.

24. The UE of claim 23, wherein the message comprises at least one of:
a first uplink control information (UCI) message carried on a physical uplink control channel (PUCCH);
a second uplink control information (UCI) message carried on a physical uplink shared channel (PUSCH);
an uplink medium access control (MAC) control element (MAC-CE); or
an uplink reference signal (RS).

25. The UE of claim 23, wherein the processor and the memory are further configured to:
request the second type of channel access procedure as a function of at least one of: a downlink (DL) traffic type; a channel access priority class (CAPC) of the next DL transmission burst; a Quality of Service (QOS) of the next DL transmission burst; a channel type used to convey the next DL transmission burst; a transmission configuration indicator (TCI) state of the DL transmission burst; or a resource type of the DL transmission burst.

26. The UE of claim 23, wherein the control indication in the message comprises at least one of: a one-time indication, an indication that remains valid until it is updated, or an indication that remains valid for a specified amount of time.

27. The UE of claim 23, wherein the processor and the memory are further configured to:
    generate the control indication to indicate a starting time for channel access.

\* \* \* \* \*